(12) United States Patent
Luo et al.

(10) Patent No.: US 8,088,868 B2
(45) Date of Patent: Jan. 3, 2012

(54) POLYMERS FUNCTIONALIZED WITH PROTECTED OXIME COMPOUNDS

(75) Inventors: Steven Luo, Copley, OH (US); Yuan-Yong Yan, Copley, OH (US); Jason T. Poulton, Akron, OH (US); Eiju Suzuki, Cuyahoga Falls, OH (US)

(73) Assignee: Bridgestone Corporation, Tokyo (JP)

( * ) Notice: Subject to any disclaimer, the term of this patent is extended or adjusted under 35 U.S.C. 154(b) by 815 days.

(21) Appl. No.: 11/955,437

(22) Filed: Dec. 13, 2007

(65) Prior Publication Data

US 2008/0146745 A1 Jun. 19, 2008

Related U.S. Application Data

(60) Provisional application No. 60/875,484, filed on Dec. 17, 2006.

(51) Int. Cl.
*C08F 4/12* (2006.01)
*C08F 4/52* (2006.01)
*C08F 36/04* (2006.01)
*C08C 19/22* (2006.01)

(52) U.S. Cl. .............. 525/331.9; 525/332.8; 525/332.9; 525/333.1; 525/333.2; 525/349; 525/351; 525/374; 525/375; 525/377; 525/383; 526/90; 526/159; 526/160; 526/164; 526/335; 526/340.4

(58) Field of Classification Search .............. 525/331.9, 525/332.8, 332.9, 333.1, 333.2, 342, 349, 525/351, 374, 375, 377, 383; 526/90, 159, 526/160, 164, 335, 340.4

See application file for complete search history.

(56) References Cited

U.S. PATENT DOCUMENTS

| | | | |
|---|---|---|---|
| 1,223,396 A | 4/1917 | Karlsson | |
| 2,227,957 A | 1/1941 | Brasse | |
| 3,297,667 A | 1/1967 | von Dohlen et al. | |
| 3,541,063 A | 11/1970 | Throckmorton et al. | |
| 3,794,604 A | 2/1974 | Throckmorton et al. | |
| 4,185,042 A | 1/1980 | Verkouw | |
| 4,210,599 A * | 7/1980 | Bridger | 558/285 |
| 4,461,883 A | 7/1984 | Takeuchi et al. | |
| 4,751,275 A | 6/1988 | Witte et al. | |
| 4,791,174 A | 12/1988 | Bronstert et al. | |
| 4,906,706 A | 3/1990 | Hattori et al. | |
| 4,990,573 A | 2/1991 | Andreussi et al. | |
| 5,064,910 A | 11/1991 | Hattori et al. | |
| 5,066,729 A | 11/1991 | Stayer et al. | |
| 5,109,907 A | 5/1992 | Stayer et al. | |
| 5,227,431 A | 7/1993 | Lawson et al. | |
| 5,310,798 A | 5/1994 | Lawson et al. | |
| 5,508,333 A | 4/1996 | Shimizu | |
| 5,567,784 A | 10/1996 | Wieder et al. | |
| 5,844,050 A | 12/1998 | Fukahori et al. | |
| 5,866,171 A | 2/1999 | Kata | |
| 5,866,650 A | 2/1999 | Lawson et al. | |
| 5,876,527 A | 3/1999 | Tsuruta et al. | |
| 5,916,961 A | 6/1999 | Hergenrother et al. | |
| 5,931,211 A | 8/1999 | Tamura | |
| 5,971,046 A | 10/1999 | Koch et al. | |
| 6,114,032 A * | 9/2000 | Kelber | 428/336 |
| 6,117,927 A | 9/2000 | Toba et al. | |
| 6,172,160 B1 | 1/2001 | Nakamura et al. | |
| 6,194,505 B1 | 2/2001 | Sone et al. | |
| 6,197,888 B1 | 3/2001 | Luo | |
| 6,255,416 B1 | 7/2001 | Sone et al. | |
| 6,291,591 B1 | 9/2001 | Luo | |
| 6,303,692 B1 | 10/2001 | Luo | |
| 6,699,813 B2 | 3/2004 | Luo et al. | |
| 6,759,497 B2 | 7/2004 | Grun et al. | |
| 6,838,526 B1 | 1/2005 | Sone et al. | |
| 6,897,270 B2 | 5/2005 | Ozawa et al. | |
| 6,977,281 B1 | 12/2005 | Ozawa et al. | |
| 6,992,147 B1 | 1/2006 | Ozawa et al. | |
| 7,008,899 B2 | 3/2006 | Luo et al. | |
| 7,094,849 B2 | 8/2006 | Luo et al. | |
| 7,294,680 B2 | 11/2007 | Sone et al. | |
| 7,351,776 B2 | 4/2008 | Tartamella et al. | |
| 2006/0004131 A1 | 1/2006 | Ozawa et al. | |
| 2006/0025539 A1 | 2/2006 | Ozawa et al. | |
| 2006/0030677 A1 | 2/2006 | Ozawa et al. | |
| 2007/0149717 A1 | 6/2007 | Luo et al. | |

FOREIGN PATENT DOCUMENTS

| | | |
|---|---|---|
| EP | 0863165 | 6/2003 |
| GB | 835752 | 5/1960 |
| JP | 05-051406 | 3/1993 |
| JP | 05-059103 | 3/1993 |
| JP | 10-306113 | 11/1998 |
| JP | 11-035633 | 2/1999 |
| RU | 2114128 C1 * | 6/1998 |
| WO | 01/34659 | 5/2001 |
| WO | WO 01/34659 A1 * | 5/2001 |
| WO | 02/38615 | 5/2002 |

OTHER PUBLICATIONS

Z. Shen, J. Ouyang, F. Wang, Z. Hu, F. Yu, and B. Qian, Journal of Polymer Science: Polymer Chemistry Edition, 1980, vol. 18, pp. 3345-3357.

H.L. Hsieh, H.C. Yeh, Rubber Chemistry and Technology, 1985, vol. 58, pp. 117-145.

D.J. Wilson, Journal of Polymer Science, Part A, Polymer Chemistry, 1995, vol. 33, pp. 2505-2513.

R.P. Quirk, A.M. Kells, Polymer International, 2000, vol. 49, pp. 751-756.

I. Hattori et al., "Modification of Neodymium High cis-1,4 Polybutadiene with Tin Compounds", Journal of Elastomers and Plastics, 1991, vol. 23, pp. 135-151.

I. Hattori et al., "Chemical Modification of Neodymium High cis-1,4-Polybutadiene with Styreneoxide", Polymers for Advanced Technologies, vol. 4, pp. 450-456, 1993.

* cited by examiner

*Primary Examiner* — Roberto Rabago
(74) *Attorney, Agent, or Firm* — Meredith E. Hooker; Arthur M. Reginelli

(57) ABSTRACT

A method for preparing a functionalized polymer, the method comprising the steps of (i) polymerizing conjugated diene monomer by employing a lanthanide-based catalyst to form a reactive polymer, and (ii) reacting the reactive polymer with a protected oxime compound.

18 Claims, No Drawings

POLYMERS FUNCTIONALIZED WITH PROTECTED OXIME COMPOUNDS

This application claims the benefit of U.S. Provisional Patent Application Ser. No. 60/875,484, filed on Dec. 17, 2006.

FIELD OF THE INVENTION

One or more embodiments of the present invention relates to functionalized polymers and methods for their manufacture.

BACKGROUND OF THE INVENTION

In the art of manufacturing tires, it is desirable to employ rubber vulcanizates that give reduced hysteresis, i.e., less loss of mechanical energy to heat. For example, rubber vulcanizates that show reduced hysteresis are advantageously employed in tire components, such as sidewalls and treads, to yield tires having desirably low rolling resistance. The hysteresis of a rubber vulcanizate is often attributed to the free polymer chain ends within the crosslinked rubber network, as well as the dissociation of filler agglomerates. Functionalized polymers have been employed to reduce hysteresis. The functional group of the functionalized polymer may reduce the number of free polymer chain ends via interaction with filler particles. Also, the functional group may reduce filler agglomeration. Nevertheless, whether a particular functional group imparted to a polymer can reduce hysteresis is often unpredictable.

Functionalized polymers may be prepared by post-polymerization treatment of reactive polymers with certain functionalizing agents. However, whether a reactive polymer can be functionalized by treatment with a particular functionalizing agent can be unpredictable. For example, functionalizing agents that work for one type of polymer do not necessarily work for another type of polymer, and vice versa.

Lanthanide-based catalyst systems may be useful for polymerizing conjugated diene monomers to form polydienes having high cis-1,4-linkage contents. The resulting cis-1,4-polydienes may display pseudo-living characteristics in that, upon completion of the polymerization, some of the polymer chains may possess reactive ends that can react with certain functionalizing agents to yield functionalized polymers. Also, the cis-1,4-polydienes prepared with lanthanide-based catalysts have a linear backbone structure, which is believed to provide better tensile properties, higher abrasion resistance, lower hysteresis loss, and better fatigue resistance than those of analogous polymers prepared with other catalyst systems such as titanium-based, cobalt-based, and nickel-based catalyst systems. The cis-1,4-polydienes prepared with lanthanide-based catalysts are particularly suitable for use in tire components such as sidewalls and treads.

Because functionalized polymers are advantageous, especially in the manufacture of tires, there exists a need to develop a method for producing lanthanide-catalyzed cis-1,4-polydienes that give reduced hysteresis.

SUMMARY OF THE INVENTION

One or more embodiments of the present invention provide a method for preparing a functionalized polymer, the method comprising the steps of (i) polymerizing conjugated diene monomer by employing a lanthanide-based catalyst to form a reactive polymer; and (ii) reacting the reactive polymer with a protected oxime compound.

One or more embodiments of the present invention also provide a method for preparing a functional polymer, the method comprising the steps of (i) introducing conjugated diene monomer and a lanthanide-based catalyst to form a polymerization mixture; and (ii) adding a protected oxime compound to the polymerization mixture.

One or more embodiments of the present invention also provide a functionalized polymer prepared by a method comprising the steps of (i) polymerizing conjugated diene monomer by employing a lanthanide-based catalyst to form a reactive polymer; and (ii) reacting the reactive polymer with a protected oxime compound.

DETAILED DESCRIPTION OF ILLUSTRATIVE EMBODIMENTS

According to one or more embodiments of the present invention, conjugated diene monomer can be polymerized with a lanthanide-based catalyst system to form a reactive polymer, and this polymer can then be functionalized by reaction with a protected oxime compound. The resultant functionalized polydiene can be used in the manufacture of tire components.

Examples of conjugated diene monomer include 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene. Mixtures of two or more conjugated dienes may also be utilized in copolymerization.

Practice of one or more embodiments of the present invention is not limited by the selection of any particular lanthanide-based catalyst. In one or more embodiments, the catalyst composition may include a lanthanide compound, an alkylating agent, and a halogen-containing compound that includes one or more labile halogen atoms. Where the lanthanide compound and/or alkylating agent include one or more labile halogen atoms, the catalyst need not include a separate halogen-containing compound; e.g., the catalyst may simply include a halogenated lanthanide compound and an alkylating agent. In certain embodiments, the alkylating agent may include both an aluminoxane and at least one other organoaluminum compound. In yet other embodiments, a compound containing a non-coordinating anion, or a non-coordinating anion precursor, i.e., a compound that can undergo a chemical reaction to form a non-coordinating anion, may be employed in lieu of a halogen-containing compound. In one embodiment, where the alkylating agent includes an organoaluminum hydride compound, the halogen-containing compound may be a tin halide as disclosed in U.S. Pat. No. 7,008,899, which is incorporated herein by reference. In these or other embodiments, other organometallic compounds, Lewis bases, and/or catalyst modifiers may be employed in addition to the ingredients or components set forth above. For example, in one embodiment, a nickel-containing compound may be employed as a molecular weight regulator as disclosed in U.S. Pat. No. 6,699,813, which is incorporated herein by reference.

Various lanthanide compounds or mixtures thereof can be employed. In one or more embodiments, these compounds may be soluble in hydrocarbon solvents such as aromatic hydrocarbons, aliphatic hydrocarbons, or cycloaliphatic hydrocarbons. In other embodiments, hydrocarbon-insoluble lanthanide compounds, which can be suspended in the polymerization medium to form the catalytically active species, are also useful.

Lanthanide compounds may include at least one atom of lanthanum, neodymium, cerium, praseodymium, promethium, samarium, europium, gadolinium, terbium, dysprosium, holmium, erbium, thulium, ytterbium, lutetium, and didymium. Didymium may include a commercial mixture of rare-earth elements obtained from monazite sand.

The lanthanide atom in the lanthanide compounds can be in various oxidation states including but not limited to the 0, +2, +3, and +4 oxidation states. Lanthanide compounds include, but are not limited to, lanthanide carboxylates, lanthanide organophosphates, lanthanide organophosphonates, lanthanide organophosphinates, lanthanide carbamates, lanthanide dithiocarbamates, lanthanide xanthates, lanthanide β-diketonates, lanthanide alkoxides or aryloxides, lanthanide halides, lanthanide pseudo-halides, lanthanide oxyhalides, and organolanthanide compounds.

Without wishing to limit the practice of the present invention, further discussion will focus on neodymium compounds, although those skilled in the art will be able to select similar compounds that are based upon other lanthanide metals.

Neodymium carboxylates include neodymium formate, neodymium acetate, neodymium acrylate, neodymium methacrylate, neodymium valerate, neodymium gluconate, neodymium citrate, neodymium fumarate, neodymium lactate, neodymium maleate, neodymium oxalate, neodymium 2-ethylhexanoate, neodymium neodecanoate (a.k.a. neodymium versatate), neodymium naphthenate, neodymium stearate, neodymium oleate, neodymium benzoate, and neodymium picolinate.

Neodymium organophosphates include neodymium dibutyl phosphate, neodymium dipentyl phosphate, neodymium dihexyl phosphate, neodymium diheptyl phosphate, neodymium dioctyl phosphate, neodymium bis(1-methylheptyl) phosphate, neodymium bis(2-ethylhexyl) phosphate, neodymium didecyl phosphate, neodymium didodecyl phosphate, neodymium dioctadecyl phosphate, neodymium dioleyl phosphate, neodymium diphenyl phosphate, neodymium bis (p-nonylphenyl) phosphate, neodymium butyl (2-ethylhexyl) phosphate, neodymium (1-methylheptyl) (2-ethylhexyl) phosphate, and neodymium (2-ethylhexyl) (p-nonylphenyl) phosphate.

Neodymium organophosphonates include neodymium butyl phosphonate, neodymium pentyl phosphonate, neodymium hexyl phosphonate, neodymium heptyl phosphonate, neodymium octyl phosphonate, neodymium (1-methylheptyl) phosphonate, neodymium (2-ethylhexyl) phosphonate, neodymium decyl phosphonate, neodymium dodecyl phosphonate, neodymium octadecyl phosphonate, neodymium oleyl phosphonate, neodymium phenyl phosphonate, neodymium (p-nonylphenyl) phosphonate, neodymium butyl butylphosphonate, neodymium pentyl pentylphosphonate, neodymium hexyl hexylphosphonate, neodymium heptyl heptylphosphonate, neodymium octyl octylphosphonate, neodymium (1-methylheptyl) (1-methylheptyl)phosphonate, neodymium (2-ethylhexyl) (2-ethylhexyl)phosphonate, neodymium decyl decylphosphonate, neodymium dodecyl dodecylphosphonate, neodymium octadecyl octadecylphosphonate, neodymium oleyl oleylphosphonate, neodymium phenyl phenylphosphonate, neodymium (p-nonylphenyl) (p-nonylphenyl)phosphonate, neodymium butyl (2-ethylhexyl)phosphonate, neodymium (2-ethylhexyl) butylphosphonate, neodymium (1-methylheptyl) (2-ethylhexyl)phosphonate, neodymium (2-ethylhexyl) (1-methylheptyl) phosphonate, neodymium (2-ethylhexyl) (p-nonylphenyl) phosphonate, and neodymium (p-nonylphenyl) (2-ethylhexyl)phosphonate.

Neodymium organophosphinates include neodymium butylphosphinate, neodymium pentylphosphinate, neodymium hexylphosphinate, neodymium heptylphosphinate, neodymium octylphosphinate, neodymium (1-methylheptyl) phosphinate, neodymium (2-ethylhexyl)phosphinate, neodymium decylphosphinate, neodymium dodecylphosphinate, neodymium octadecylphosphinate, neodymium oleylphosphinate, neodymium phenylphosphinate, neodymium (p-nonylphenyl)phosphinate, neodymium dibutylphosphinate, neodymium dipentylphosphinate, neodymium dihexylphosphinate, neodymium diheptylphosphinate, neodymium dioctylphosphinate, neodymium bis(1-methylheptyl)phosphinate, neodymium bis(2-ethylhexyl)phosphinate, neodymium didecylphosphinate, neodymium didodecylphosphinate, neodymium dioctadecylphosphinate, neodymium dioleylphosphinate, neodymium diphenylphosphinate, neodymium bis(p-nonylphenyl)phosphinate, neodymium butyl(2-ethylhexyl)phosphinate, neodymium (1-methylheptyl)(2-ethylhexyl)phosphinate, and neodymium (2-ethylhexyl)(p-nonylphenyl)phosphinate.

Neodymium carbamates include neodymium dimethylcarbamate, neodymium diethylcarbamate, neodymium diisopropylcarbamate, neodymium dibutylcarbamate, and neodymium dibenzylcarbamate.

Neodymium dithiocarbamates include neodymium dimethyldithiocarbamate, neodymium diethyldithiocarbamate, neodymium diisopropyldithiocarbamate, neodymium dibutyldithiocarbamate, and neodymium dibenzyldithiocarbamate.

Neodymium xanthates include neodymium methylxanthate, neodymium ethylxanthate, neodymium isopropylxanthate, neodymium butylxanthate, and neodymium benzylxanthate.

Neodymium β-diketonates include neodymium acetylacetonate, neodymium trifluoroacetylacetonate, neodymium hexafluoroacetylacetonate, neodymium benzoylacetonate, and neodymium 2,2,6,6-tetramethyl-3,5-heptanedionate.

Neodymium alkoxides or aryloxides include neodymium methoxide, neodymium ethoxide, neodymium isopropoxide, neodymium 2-ethylhexoxide, neodymium phenoxide, neodymium nonylphenoxide, and neodymium naphthoxide.

Neodymium halides include neodymium fluoride, neodymium chloride, neodymium bromide, and neodymium iodide. Suitable neodymium pseudo-halides include neodymium cyanide, neodymium cyanate, neodymium thiocyanate, neodymium azide, and neodymium ferrocyanide. Suitable neodymium oxyhalides include neodymium oxyfluoride, neodymium oxychloride, and neodymium oxybromide. Where neodymium halides, neodymium oxyhalides, or other neodymium compounds containing labile halogen atoms are employed, the neodymium-containing compound can also serve as the halogen-containing compound. A Lewis base such as tetrahydrofuran (THF) may be employed as an aid for solubilizing this class of neodymium compounds in inert organic solvents.

The term organolanthanide compound may refer to any lanthanide compound containing at least one lanthanide-carbon bond. These compounds are predominantly, though not exclusively, those containing cyclopentadienyl (Cp), substituted cyclopentadienyl, allyl, and substituted allyl ligands. Suitable organolanthanide compounds include $Cp_3Ln$, $Cp_2LnR$, $Cp_2LnCl$, $CpLnCl_2$, $CpLn(cyclooctatetraene)$, $(C_5Me_5)_2LnR$, $LnR_3$, $Ln(allyl)_3$, and $Ln(allyl)_2Cl$, where Ln represents a lanthanide atom, and R represents a hydrocarbyl group.

Various alkylating agents, or mixtures thereof, can be used. Alkylating agents, which may also be referred to as hydrocarbylating agents, include organometallic compounds that can transfer hydrocarbyl groups to another metal. Typically, these agents include organometallic compounds of electropositive metals such as Groups 1, 2, and 3 metals (Groups IA, IIA, and IIIA metals). In one or more embodiments, alkylating agents include organoaluminum and organomagnesium compounds. Where the alkylating agent includes a labile halogen atom, the alkylating agent may also serve as the halogen-containing compound.

The term "organoaluminum compound" may refer to any aluminum compound containing at least one aluminum-carbon bond. In one or more embodiments, organoaluminum compounds may be soluble in a hydrocarbon solvent.

In one or more embodiments, organoaluminum compounds include those represented by the formula $AlR_nX_{3-n}$, where each R, which may be the same or different, is a mono-valent organic group that is attached to the aluminum atom via a carbon atom, where each X, which may be the same or different, is a hydrogen atom, a halogen atom, a carboxylate group, an alkoxide group, or an aryloxide group, and where n is an integer of 1 to 3. In one or more embodiments, each R may be a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups. In one or more embodiments, these groups may include from one, or the appropriate minimum carbon atoms to form the group, to 20 carbon atoms. These hydrocarbyl groups may contain heteroatoms such as, but not limited to, nitrogen, oxygen, boron, silicon, sulfur, and phosphorus atoms.

Organoaluminum compounds include, but are not limited to, trihydrocarbylaluminum, dihydrocarbylaluminum hydride, hydrocarbylaluminum dihydride, dihydrocarbylaluminum carboxylate, hydrocarbylaluminum bis(carboxylate), dihydrocarbylaluminum alkoxide, hydrocarbylaluminum dialkoxide, dihydrocarbylaluminum halide, hydrocarbylaluminum dihalide, dihydrocarbylaluminum aryloxide, and hydrocarbylaluminum diaryloxide compounds.

Trihydrocarbylaluminum compounds include trimethylaluminum, triethylaluminum, triisobutylaluminum, tri-n-propylaluminum, triisopropylaluminum, tri-n-butylaluminum, tri-t-butylaluminum, tri-n-pentylaluminum, trineopentylaluminum, tri-n-hexylaluminum, tri-n-octylaluminum, tris(2-ethylhexyl)aluminum, tricyclohexylaluminum, tris(1-methylcyclopentyl)aluminum, triphenylaluminum, tri-p-tolylaluminum, tris(2,6-dimethylphenyl)aluminum, tribenzylaluminum, diethylphenylaluminum, diethyl-p-tolylaluminum, diethylbenzylaluminum, ethyldiphenylaluminum, ethyldi-p-tolylaluminum, and ethyldibenzylaluminum.

Dihydrocarbylaluminum hydride compounds include diethylaluminum hydride, di-n-propylaluminum hydride, diisopropylaluminum hydride, di-n-butylaluminum hydride, diisobutylaluminum hydride, di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride, and benzyl-n-octylaluminum hydride.

Hydrocarbylaluminum dihydrides include ethylaluminum dihydride, n-propylaluminum dihydride, isopropylaluminum dihydride, n-butylaluminum dihydride, isobutylaluminum dihydride, and n-octylaluminum dihydride.

Dihydrocarbylaluminum chloride compounds include diethylaluminum chloride, di-n-propylaluminum chloride, diisopropylaluminum chloride, di-n-butylaluminum chloride, diisobutylaluminum chloride, di-n-octylaluminum chloride, diphenylaluminum chloride, di-p-tolylaluminum chloride, dibenzylaluminum chloride, phenylethylaluminum chloride, phenyl-n-propylaluminum chloride, phenylisopropylaluminum chloride, phenyl-n-butylaluminum chloride, phenylisobutylaluminum chloride, phenyl-n-octylaluminum chloride, p-tolylethylaluminum chloride, p-tolyl-n-propylaluminum chloride, p-tolylisopropylaluminum chloride, p-tolyl-n-butylaluminum chloride, p-tolylisobutylaluminum chloride, p-tolyl-n-octylaluminum chloride, benzylethylaluminum chloride, benzyl-n-propylaluminum chloride, benzylisopropylaluminum chloride, benzyl-n-butylaluminum chloride, benzylisobutylaluminum chloride, and benzyl-n-octylaluminum chloride.

Hydrocarbylaluminum dichloride include ethylaluminum dichloride, n-propylaluminum dichloride, isopropylaluminum dichloride, n-butylaluminum dichloride, isobutylaluminum dichloride, and n-octylaluminum dichloride.

Other organoaluminum compounds include dimethylaluminum hexanoate, diethylaluminum octoate, diisobutylaluminum 2-ethylhexanoate, dimethylaluminum neodecanoate, diethylaluminum stearate, diisobutylaluminum oleate, methylaluminum bis(hexanoate), ethylaluminum bis(octoate), isobutylaluminum bis(2-ethylhexanoate), methylaluminum bis(neodecanoate), ethylaluminum bis(stearate), isobutylaluminum bis(oleate), dimethylaluminum methoxide, diethylaluminum methoxide, diisobutylaluminum methoxide, dimethylaluminum ethoxide, diethylaluminum ethoxide, diisobutylaluminum ethoxide, dimethylaluminum phenoxide, diethylaluminum phenoxide, diisobutylaluminum phenoxide, methylaluminum dimethoxide, ethylaluminum dimethoxide, isobutylaluminum dimethoxide, methylaluminum diethoxide, ethylaluminum diethoxide, isobutylaluminum diethoxide, methylaluminum diphenoxide, ethylaluminum diphenoxide, isobutylaluminum diphenoxide, and the like, and mixtures thereof.

Another class of organoaluminum compounds include aluminoxanes. Aluminoxanes include oligomeric linear aluminoxanes that can be represented by the general formula:

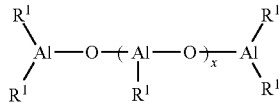

and oligomeric cyclic aluminoxanes that can be represented by the general formula:

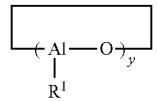

where x may be an integer of 1 to about 100, and in other embodiments about 10 to about 50; y may be an integer of 2 to about 100, and in other embodiments about 3 to about 20; and where each $R^1$, which may be the same or different, may be a mono-valent organic group that is attached to the aluminum atom via a carbon atom. In one or more embodiments, each $R^1$ is a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups. These hydrocarbyl groups may contain heteroatoms such as, but not limited to, nitrogen, oxygen, boron, silicon, sulfur, and phosphorus atoms. It should be noted that the number of moles of the aluminoxane as used in this application refers to the number of moles of the aluminum atoms rather than the number of moles of the oligomeric aluminoxane molecules. This convention is commonly employed in the art of catalysis utilizing aluminoxanes.

Aluminoxanes can be prepared by reacting trihydrocarbylaluminum compounds with water. This reaction can be performed according to known methods, such as (1) a method in which the trihydrocarbylaluminum compound may be dissolved in an organic solvent and then contacted with water, (2) a method in which the trihydrocarbylaluminum compound may be reacted with water of crystallization contained in, for example, metal salts, or water adsorbed in inorganic or organic compounds, and (3) a method in which the trihydrocarbylaluminum compound may be reacted with water in the presence of the monomer or monomer solution that is to be polymerized.

Aluminoxane compounds include methylaluminoxane (MAO), modified methylaluminoxane (MMAO), ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cylcohexylaluminoxane, 1-methylcyclopentylaluminoxane, phenylaluminoxane, 2,6-dimethylphenylaluminoxane, and the like, and mixtures thereof. Modified methylaluminoxane can be formed by substituting about 20-80% of the methyl groups of methylaluminoxane with $C_2$ to $C_{12}$ hydrocarbyl groups, preferably with isobutyl groups, by using techniques known to those skilled in the art.

Aluminoxanes can be used alone or in combination with other organoaluminum compounds. In one embodiment, methylaluminoxane and at least one other organoaluminum compound (e.g., $AlR_nX_{3-n}$) such as diisobutyl aluminum hydride are employed in combination.

The term organomagnesium compound may refer to any magnesium compound that contains at least one magnesium-carbon bond. Organomagnesium compounds may be soluble in a hydrocarbon solvent. One class of organomagnesium compounds that can be utilized may be represented by the formula $MgR_2$, where each R, which may be the same or different, is a mono-valent organic group, with the proviso that the group is attached to the magnesium atom via a carbon atom. In one or more embodiments, each R may be a hydrocarbyl group, and the resulting organomagnesium compounds are dihydrocarbylmagnesium compounds. Examples of the hydrocarbyl groups include, but are not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups. These hydrocarbyl groups may contain heteroatoms such as, but not limited to, nitrogen, oxygen, silicon, sulfur, and phosphorus atom.

Examples of suitable dihydrocarbylmagnesium compounds include diethylmagnesium, di-n-propylmagnesium, diisopropylmagnesium, dibutylmagnesium, dihexylmagnesium, diphenylmagnesium, dibenzylmagnesium, and mixtures thereof.

Another class of organomagnesium compounds that can be utilized include those that may be represented by the formula RMgX, where R is a mono-valent organic group, with the proviso that the group is attached to the magnesium atom via a carbon atom, and X is a hydrogen atom, a halogen atom, a carboxylate group, an alkoxide group, or an aryloxide group. In one or more embodiments, R may be a hydrocarbyl group such as, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups. These hydrocarbyl groups may contain heteroatoms such as, but not limited to, nitrogen, oxygen, boron, silicon, sulfur, and phosphorus atoms. In one or more embodiments, X is a carboxylate group, an alkoxide group, or an aryloxide group.

Exemplary types of organomagnesium compounds that can be represented by the formula RMgX include, but are not limited to, hydrocarbylmagnesium hydride, hydrocarbylmagnesium halide, hydrocarbylmagnesium carboxylate, hydrocarbylmagnesium alkoxide, hydrocarbylmagnesium aryloxide, and mixtures thereof.

Specific examples of organomagnesium compounds that may be represented by the formula RMgX include methylmagnesium hydride, ethylmagnesium hydride, butylmagnesium hydride, hexylmagnesium hydride, phenylmagnesium hydride, benzylmagnesium hydride, methylmagnesium chloride, ethylmagnesium chloride, butylmagnesium chloride, hexylmagnesium chloride, phenylmagnesium chloride, benzylmagnesium chloride, methylmagnesium bromide, ethylmagnesium bromide, butylmagnesium bromide, hexylmagnesium bromide, phenylmagnesium bromide, benzylmagnesium bromide, methylmagnesium hexanoate, ethylmagnesium hexanoate, butylmagnesium hexanoate, hexylmagnesium hexanoate, phenylmagnesium hexanoate, benzylmagnesium hexanoate, methylmagnesium ethoxide, ethylmagnesium ethoxide, butylmagnesium ethoxide, hexylmagnesium ethoxide, phenylmagnesium ethoxide, benzylmagnesium ethoxide, methylmagnesium phenoxide, ethylmagnesium phenoxide, butylmagnesium phenoxide, hexylmagnesium phenoxide, phenylmagnesium phenoxide, benzylmagnesium phenoxide, and the like, and mixtures thereof.

Various halogen-containing compounds, or mixtures thereof, that contain one or more labile halogen atoms can be employed. Examples of halogen atoms include, but are not limited to, fluorine, chlorine, bromine, and iodine. A combination of two or more halogen-containing compounds having different halogen atoms can also be utilized. In one or more embodiments, the halogen-containing compounds may be soluble in a hydrocarbon solvent. In other embodiments, hydrocarbon-insoluble halogen-containing compounds, which can be suspended in the polymerization medium to form the catalytically active species, may be useful.

Suitable types of halogen-containing compounds include, but are not limited to, elemental halogens, mixed halogens, hydrogen halides, organic halides, inorganic halides, metallic halides, organometallic halides, and mixtures thereof.

Elemental halogens include fluorine, chlorine, bromine, and iodine. Mixed halogens include iodine monochloride, iodine monobromide, iodine trichloride, and iodine pentafluoride.

Hydrogen halides include hydrogen fluoride, hydrogen chloride, hydrogen bromide, and hydrogen iodide.

Organic halides include t-butyl chloride, t-butyl bromides, allyl chloride, allyl bromide, benzyl chloride, benzyl bromide, chloro-di-phenylmethane, bromo-di-phenylmethane, triphenylmethyl chloride, triphenylmethyl bromide, benzylidene chloride, benzylidene bromide, methyltrichlorosilane, phenyltrichlorosilane, dimethyldichlorosilane, diphenyldichlorosilane, trimethylchlorosilane, benzoyl chloride, benzoyl bromide, propionyl chloride, propionyl bromide, methyl chloroformate, and methyl bromoformate.

Inorganic halides include phosphorus trichloride, phosphorus tribromide, phosphorus pentachloride, phosphorus oxychloride, phosphorus oxybromide, boron trifluoride, boron trichloride, boron tribromide, silicon tetrafluoride, silicon tetrachloride, silicon tetrabromide, silicon tetraiodide, arsenic trichloride, arsenic tribromide, arsenic triiodide, selenium tetrachloride, selenium tetrabromide, tellurium tetrachloride, tellurium tetrabromide, and tellurium tetraiodide.

Metallic halides include tin tetrachloride, tin tetrabromide, aluminum trichloride, aluminum tribromide, antimony trichloride, antimony pentachloride, antimony tribromide, aluminum triiodide, aluminum trifluoride, gallium trichloride, gallium tribromide, gallium triiodide, gallium trifluoride, indium trichloride, indium tribromide, indium triiodide, indium trifluoride, titanium tetrachloride, titanium tetrabromide, titanium tetraiodide, zinc dichloride, zinc dibromide, zinc diiodide, and zinc difluoride.

Organometallic halides include dimethylaluminum chloride, diethylaluminum chloride, dimethylaluminum bromide, diethylaluminum bromide, dimethylaluminum fluoride, diethylaluminum fluoride, methylaluminum dichloride, ethylaluminum dichloride, methylaluminum dibromide, ethylaluminum dibromide, methylaluminum difluoride, ethylaluminum difluoride, methylaluminum sesquichloride, ethylaluminum sesquichloride, isobutylaluminum sesquichloride, methylmagnesium chloride, methylmagnesium bromide, methylmagnesium iodide, ethylmagnesium chloride, ethylmagnesium bromide, butylmagnesium chloride, butylmagnesium bromide, phenylmagnesium chloride, phenylmagnesium bromide, benzylmagnesium chloride, trimethyltin chloride, trimethyltin bromide, triethyltin chloride, triethyltin bromide, di-t-butyltin dichloride, di-t-butyltin dibromide, dibutyltin dichloride, dibutyltin dibromide, tributyltin chloride, and tributyltin bromide.

Compounds containing non-coordinating anions are known in the art. In general, non-coordinating anions are sterically bulky anions that do not form coordinate bonds with, for example, the active center of a catalyst system due to steric hindrance. Exemplary non-coordinating anions include tetraarylborate anions and fluorinated tetraarylborate anions. Compounds containing a non-coordinating anion also contain a counter cation such as a carbonium, ammonium, or phosphonium cation. Exemplary counter cations include triarylcarbonium cations and N,N-dialkylanilinium cations. Examples of compounds containing a non-coordinating anion and a counter cation include triphenylcarbonium tetrakis(pentafluorophenyl)borate, N,N-dimethylanilinium tetrakis(pentafluorophenyl)borate, triphenylcarbonium tetrakis[3,5-bis(trifluoromethyl)phenyl]borate, and N,N-dimethylanilinium tetrakis[3,5-bis(trifluoromethyl)phenyl]borate.

Non-coordinating anion precursors include compounds that can form a non-coordinating anion under reaction conditions. Exemplary non-coordinating anion precursors include triarylboron compounds, $BR_3$, where R is a strong electron-withdrawing aryl group such as a pentafluorophenyl or 3,5-bis(trifluoromethyl)phenyl group.

The catalyst composition used in this invention may be formed by combining or mixing the foregoing catalyst ingredients. Although one or more active catalyst species are believed to result from the combination of the catalyst ingredients, the degree of interaction or reaction between the various catalyst ingredients or components is not known with any great degree of certainty. Therefore, the term "catalyst composition" has been employed to encompass a simple mixture of the ingredients, a complex of the various ingredients that is caused by physical or chemical forces of attraction, a chemical reaction product of the ingredients, or a combination of the foregoing.

The foregoing catalyst composition may have high catalytic activity for polymerizing conjugated dienes into cis-1,4-polydienes over a wide range of catalyst concentrations and catalyst ingredient ratios. Several factors may impact the optimum concentration of any one of the catalyst ingredients. For example, because the catalyst ingredients may interact to form an active species, the optimum concentration for any one catalyst ingredient may be dependent upon the concentrations of the other catalyst ingredients.

In one or more embodiments, the molar ratio of the alkylating agent to the lanthanide compound (alkylating agent/Ln) can be varied from about 1:1 to about 1,000:1, in other embodiments from about 2:1 to about 500:1, and in other embodiments from about 5:1 to about 200:1.

In those embodiments where both an aluminoxane and at least one other organoaluminum agent are employed as alkylating agents, the molar ratio of the aluminoxane to the lanthanide compound (aluminoxane/Ln) can be varied from 5:1 to about 1,000:1, in other embodiments from about 10:1 to about 700:1, and in other embodiments from about 20:1 to about 500:1; and the molar ratio of the at least one other organoaluminum compound to the lanthanide compound (Al/Ln) can be varied from about 1:1 to about 200:1, in other embodiments from about 2:1 to about 150:1, and in other embodiments from about 5:1 to about 100:1.

The molar ratio of the halogen-containing compound to the lanthanide compound is best described in terms of the ratio of the moles of halogen atoms in the halogen-containing compound to the moles of lanthanide atoms in the lanthanide compound (halogen/Ln). In one or more embodiments, the halogen/Ln molar ratio can be varied from about 0.5:1 to about 20:1, in other embodiments from about 1:1 to about 10:1, and in other embodiments from about 2:1 to about 6:1.

In yet another embodiment, the molar ratio of the non-coordinating anion or non-coordinating anion precursor to the lanthanide compound (An/Ln) may be from about 0.5:1 to about 20:1, in other embodiments from about 0.75:1 to about 10:1, and in other embodiments from about 1:1 to about 6:1.

The catalyst composition can be formed by various methods.

In one embodiment, the catalyst composition may be formed in situ by adding the catalyst ingredients to a solution containing monomer and solvent, or to bulk monomer, in either a stepwise or simultaneous manner. In one embodiment, the alkylating agent can be added first, followed by the lanthanide compound, and then followed by the halogen-containing compound, if used, or by the compound containing a non-coordinating anion or the non-coordinating anion precursor.

In another embodiment, the catalyst composition may be preformed. That is, the catalyst ingredients are pre-mixed outside the polymerization system either in the absence of any monomer or in the presence of a small amount of at least one conjugated diene monomer at an appropriate temperature, which may be from about −20° C. to about 80° C. The amount of conjugated diene monomer that may be used for preforming the catalyst can range from about 1 to about 500 moles, in other embodiments from about 5 to about 250 moles, and in other embodiments from about 10 to about 100 moles per mole of the lanthanide compound. The resulting catalyst composition may be aged, if desired, prior to being added to the monomer that is to be polymerized.

In yet another embodiment, the catalyst composition may be formed by using a two-stage procedure. The first stage may involve combining the alkylating agent with the lanthanide compound either in the absence of any monomer or in the presence of a small amount of at least one conjugated diene monomer at an appropriate temperature, which may be from about −20° C. to about 80° C. The amount of monomer employed in the first stage may be similar to that set forth above for performing the catalyst. In the second stage, the mixture formed in the first stage and the halogen-containing compound, non-coordinating anion, or non-coordinating anion precursor can be charged in either a stepwise or simultaneous manner to the monomer that is to be polymerized.

In one or more embodiments, a solvent may be employed as a carrier to either dissolve or suspend the catalyst or catalyst ingredients in order to facilitate the delivery of the catalyst or catalyst ingredients to the polymerization system. In other embodiments, conjugated diene monomer can be used as the catalyst carrier. In yet other embodiments, the catalyst ingredients can be used in their neat state without any solvent.

In one or more embodiments, suitable solvents include those organic compounds that will not undergo polymerization or incorporation into propagating polymer chains during the polymerization of monomer in the presence of catalyst. In one or more embodiments, these organic species are liquid at ambient temperature and pressure. In one or more embodiments, these organic solvents are inert to the catalyst. Exemplary organic solvents include hydrocarbons with a low or relatively low boiling point such as aromatic hydrocarbons, aliphatic hydrocarbons, and cycloaliphatic hydrocarbons. Non-limiting examples of aromatic hydrocarbons include benzene, toluene, xylenes, ethylbenzene, diethylbenzene, and mesitylene. Non-limiting examples of aliphatic hydrocarbons include n-pentane, n-hexane, n-heptane, n-octane, n-nonane, n-decane, isopentane, isohexanes, isopentanes, isooctanes, 2,2-dimethylbutane, petroleum ether, kerosene, and petroleum spirits. And, non-limiting examples of cycloaliphatic hydrocarbons include cyclopentane, cyclohexane, methylcyclopentane, and methylcyclohexane. Mixtures of the above hydrocarbons may also be used. As is known in the art, aliphatic and cycloaliphatic hydrocarbons may be desirably employed for environmental reasons. The low-boiling hydrocarbon solvents are typically separated from the polymer upon completion of the polymerization.

Other examples of organic solvents include high-boiling hydrocarbons of high molecular weights, such as paraffinic oil, aromatic oil, or other hydrocarbon oils that are commonly used to oil-extend polymers. Since these hydrocarbons are non-volatile, they typically do not require separation and remain incorporated in the polymer.

The production of polymer according to this invention can be accomplished by polymerizing conjugated diene monomer in the presence of a catalytically effective amount of the foregoing catalyst composition. The introduction of the catalyst composition, the conjugated diene monomer, and any solvent if employed forms a polymerization mixture in which the polymer product is formed. The total catalyst concentration to be employed in the polymerization mixture may depend on the interplay of various factors such as the purity of the ingredients, the polymerization temperature, the polymerization rate and conversion desired, the molecular weight desired, and many other factors. Accordingly, a specific total catalyst concentration cannot be definitively set forth except to say that catalytically effective amounts of the respective catalyst ingredients can be used. In one or more embodiments, the amount of the lanthanide compound used can be varied from about 0.01 to about 2 mmol, in other embodiments from about 0.02 to about 1 mmol, and in other embodiments from about 0.05 to about 0.5 mmol per 100 g of conjugated diene monomer.

In one or more embodiments, the polymerization of conjugated diene monomer according to this invention may be carried out in a polymerization system that includes a substantial amount of solvent. In one embodiment, a solution polymerization system may be employed in which both the monomer to be polymerized and the polymer formed are soluble in the solvent. In another embodiment, a precipitation polymerization system may be employed by choosing a solvent in which the polymer formed is insoluble. In both cases, an amount of solvent in addition to the amount of solvent that may be used in preparing the catalyst is usually added to the polymerization system. The additional solvent may be the same as or different from the solvent used in preparing the catalyst. Exemplary solvents have been set forth above. In one or more embodiments, the solvent content of the polymerization mixture may be more than 20% by weight, in other embodiments more than 50% by weight, and in still other embodiments more than 80% by weight based on the total weight of the polymerization mixture.

In other embodiments, the polymerization system employed may be generally considered a bulk polymerization system that includes substantially no solvent or a minimal amount of solvent. Those skilled in the art will appreciate the benefits of bulk polymerization processes (i.e., processes where monomer acts as the solvent), and therefore the polymerization system includes less solvent than will deleteriously impact the benefits sought by conducting bulk polymerization. In one or more embodiments, the solvent content of the polymerization mixture may be less than about 20% by weight, in other embodiments less than about 10% by weight, and in still other embodiments less than about 5% by weight based on the total weight of the polymerization mixture. In still another embodiment, the polymerization mixture is substantially devoid of solvent, which refers to the absence of that amount of solvent that would otherwise have an appreciable impact on the polymerization process. Polymerization systems that are substantially devoid of solvent may be referred to as including substantially no solvent. In particular embodiments, the polymerization mixture is devoid of solvent.

The polymerization may be conducted by employing any conventional polymerization vessels known in the art. In one or more embodiments, solution polymerization can be conducted in a conventional stirred-tank reactor. In other embodiments, bulk polymerization can be conducted in a conventional stirred-tank reactor, especially if the monomer conversion is less than about 60%. In still other embodiments, especially where the monomer conversion in a bulk polymerization process is higher than about 60%, which typically results in a highly viscous cement, the bulk polymerization may be conducted in an elongated reactor in which the viscous cement under polymerization is driven to move by piston, or substantially by piston. For example, extruders in which the cement is pushed along by a self-cleaning single-screw or double-screw agitator are suitable for this purpose. Examples of useful bulk polymerization processes are disclosed in U.S. Publication No. 2005/0197474 A1, which is incorporated herein by reference.

In one or more embodiments, all of the ingredients used for the polymerization can be combined within a single vessel (e.g., a conventional stirred-tank reactor), and all steps of the polymerization process can be conducted within this vessel. In other embodiments, two or more of the ingredients can be pre-combined in one vessel and then transferred to another vessel where the polymerization of monomer (or at least a major portion thereof) may be conducted.

The polymerization can be carried out as a batch process, a continuous process, or a semi-continuous process. In the semi-continuous process, the monomer is intermittently charged as needed to replace that monomer already polymerized. In one or more embodiments, the conditions under which the polymerization proceeds may be controlled to maintain the temperature of the polymerization mixture within a range from about −10° C. to about 200° C., in other embodiments from about 0° C. to about 150° C., and in other embodiments from about 20° C. to about 100° C. In one or more embodiments, the heat of polymerization may be removed by external cooling by a thermally controlled reactor jacket, internal cooling by evaporation and condensation of the monomer through the use of a reflux condenser connected to the reactor, or a combination of the two methods. Also, conditions may be controlled to conduct the polymerization under a pressure of from about 0.1 atmosphere to about 50 atmospheres, in other embodiments from about 0.5 atmosphere to about 20 atmosphere, and in other embodiments from about 1 atmosphere to about 10 atmospheres. In one or more embodiments, the pressures at which the polymerization may be carried out include those that ensure that the majority of the monomer is in the liquid phase. In these or other embodiments, the polymerization mixture may be maintained under anaerobic conditions.

The polymers prepared by employing the lanthanide-based catalyst system disclosed herein may include reactive chain ends before the polymerization mixture is quenched. These reactive polymers, which may be referred to as pseudo-living polymers, can be reacted with protected oxime compounds or mixtures thereof to form the functionalized polymers of this invention.

In one or more embodiments, protected oxime compounds include the condensation product of an aldehyde or ketone and a protected hydroxylamine in which the hydrogen atom of the hydroxyl group (OH) has been replaced by a mono-valent organic group. Typically, one mole of the aldehyde or ketone can be reacted with one mole of protected hydroxylamine to form a condensation product, which is the protected oxime.

In one or more embodiments, protected oximes may include those compounds defined by the formula I or II

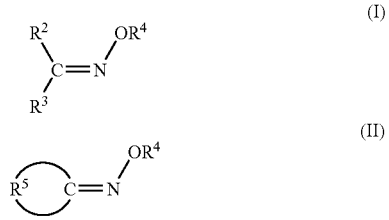

where $R^2$ and $R^3$ are each independently a hydrogen atom or a mono-valent organic group, $R^4$ is a mono-valent organic group, and $R^5$ is divalent organic group. In one ore more embodiments, the mono-valent organic groups may be hydrocarbyl groups.

In one embodiment, where $R^4$ is a hydrocarbyl group, the protected oximes may be called O-hydrocarbyloximes or oxime ethers. In another embodiment, where $R^4$ is an acyl group, the protected oximes may be called O-acyloximes or oxime carboxylates. In yet another embodiment, where $R^4$ is a sulfonyl group, the protected oximes may be called O-sulfonyloximes or oxime sulfonates. In still other embodiments, where $R^4$ is a silyl group, the protected oximes may be called O-silyloximes or oxime silyl ethers.

In one or more embodiments, the hydrocarbyl groups, which may include substituted hydrocarbyl groups, can include, but are not limited to, alkyl, cycloalkyl, substituted cycloalkyl, alkenyl cycloalkenyl, substituted cycloalkenyl, aryl, allyl, substituted aryl, aralkyl, alkaryl, or alkynyl groups. In one or more embodiments, these groups may include from one, or the appropriate minimum number of carbon atoms to form the group, to 20 carbon atoms. These hydrocarbyl groups may contain heteroatoms such as, but not limited to, nitrogen, boron, oxygen, silicon, sulfur, and phosphorus atoms. In certain embodiments, the mono-valent organic group may be a heterocyclic group.

Specific examples of alkyl groups include methyl, ethyl, n-propyl, iso-propyl, n-butyl, iso-butyl, tert-butyl, n-pentyl, iso-pentyl, n-hexyl, n-heptyl, 2-ethyl-hexyl, n-octyl, n-nonyl, and n-decyl groups.

Specific examples of cycloalkyl groups include cyclopropyl, cyclobutyl, cyclopentyl, cyclohexyl, 2-methylcyclohexyl, 2-t-butylcyclohexyl and 4-t-butylcyclohexyl groups.

Specific examples of aryl groups include phenyl, substituted phenyl, biphenyl, substituted biphenyl, bicyclic aryl, substituted bicyclic aryl, polycyclic aryl, and substituted polycyclic aryl groups. Substituted aryl groups include those where a hydrogen atom is replaced by a mono-valent organic group such as a hydrocarbyl group.

Exemplary substituted phenyl groups include 2-methylphenyl, 3-methylphenyl, 4-methylphenyl, 2,3-dimethylphenyl, 3,4-dimethylphenyl, 2,5-dimethylphenyl, 2,6-dimethylphenyl, and 2,4,6-trimethylphenyl (also called mesityl) groups.

Exemplary bicyclic or polycyclic aryl groups include 1-naphthyl, 2-napthyl, 9-anthryl, 9-phenanthryl, 2-benzo[b]thienyl, 3-benzo[b]thienyl, 2-naphtho[2,3-b]thienyl, 2-thianthrenyl, 1-isobenzofuranyl, 2-xanthenyl, 2-phenoxathiinyl, 2-indolizinyl, N-methyl-2-indolyl, N-methyl-indazol-3-yl, N-methyl-8-purinyl, 3-isoquinolyl, 2-quinolyl, 3-cinnolinyl, 2-pteridinyl, N-methyl-2-carbazolyl, N-methyl-β-carbolin-3-yl, 3-phenanthridinyl, 2-acridinyl, 1-phthalazinyl, 1,8-naphthyridin-2-yl, 2-quinoxalinyl, 2-quinazolinyl, 1,7-phenanthrolin-3-yl, 1-phenazinyl, N-methyl-2-phenothiazinyl, 2-phenarsazinyl, and N-methyl-2-phenoxazinyl groups.

Exemplary heterocyclic groups include 2-thienyl, 3-thienyl, 2-furyl, 3-furyl, N-methyl-2-pyrrolyl, N-methyl-3-pyrrolyl, N-methyl-2-imidazolyl, 1-pyrazolyl, N-methyl-3-pyrazolyl, N-methyl-4-pyrazolyl, 2-pyridyl, 3-pyridyl, 4-pyridyl, pyrazinyl, 2-pyrimidinyl, 3-pyridazinyl, 3-isothiazolyl, 3-isoxazolyl, 3-furazanyl, 2-triazinyl, morpholinyl, thiomorpholinyl, piperidinyl, piperazinyl, pyrrolidinyl, pyrrolinyl, imidazolidinyl, and imidazolinyl groups.

In one or more embodiments, the divalent organic group $R^5$ may include a hydrocarbylene group or substituted hydrocarbylene group such as, but not limited to, alkylene, cycloalkylene, substituted alkylene, substituted cycloalkylene, alkenylene, cycloalkenylene, substituted alkenylene, substituted cycloalkenylene, arylene, and substituted arylene groups. Substituted hydrocarbylene group includes a hydrocarbylene group in which one or more hydrogen atoms have been replaced by a substituent such as an alkyl group. The divalent organic groups may also contain one or more heteroatoms such as, but not limited to, nitrogen, oxygen, boron, silicon, sulfur, and phosphorus atoms.

Specific examples of O-hydrocarbyloximes include formaldehyde O-benzyloxime, acetaldehyde O-benzyloxime, acetaldehyde O-methyloxime, propanal O-benzyloxime, butanal O-methyloxime, pentanal O-methyloxime, cyclopentanecarboxaldehyde O-methyloxime, hexanal O-methyloxime, cyclohexanecarboxaldehyde O-methyloxime, heptanal O-methyloxime, cycloheptanecarboxaldehyde O-methyloxime, octanal O-methyloxime, cyclooctanecarboxaldehyde O-methyloxime, nonanal O-methyloxime, cyclononanecarboxaldehyde O-methyloxime, benzaldehyde O-methyloxime, 2-methoxybenzaldehyde O-methyloxime, 4-diethylaminobenzaldehyde O-methyloxime, 4-diethylaminobenzaldehyde O-benzyloxime, trans-cinnamaldehyde O-benzyloxime, ferrocenecarboxaldehyde O-methyloxime, acetylferrocene O-methyloxime, acetone O-methyloxime, 2-butanone O-methyloxime, 2-pentanone O-methyloxime, 3-pentanone O-methyloxime, 2-hexanone O-methyloxime, 3-hexanone O-methyloxime, 2-heptanone O-methyloxime, 3-heptanone O-methyloxime, 4-heptanone O-methyloxime, 2-octanone O-methyloxime, 3-octanone O-methyloxime, 2-nonanone O-methyloxime, 3-nonanone O-methyloxime, 5-nonanone O-methyloxime, acetophenone O-methyloxime, benzophenone O-methyloxime, 4,4'-bis(diethylamino)benzophenone O-methyloxime, cyclobutanone O-methyloxime, cyclopentanone O-methyloxime, cyclohexanone O-methyloxime, cycloheptanone O-methyloxime, cyclooctanone O-methyloxime, cyclononanone O-methyloxime, cyclodecanone O-methyloxime, cycloundecanone O-methyloxime, cyclododecanone O-methyloxime, and cyclotridecanone O-methyloxime, benzophenone O-methyloxime, 4,4'-bis(diethylamino)benzophenone O-methyloxime, 2-pyridinecarboxaldehyde O-methyloxime, 2-pyridinecarboxaldehyde O-allyloxime, tetrahydrofuran-3-carboxaldehyde O-methyloxime, 2-furancarboxaldehyde O-methyloxime, 3-furancarboxaldehyde O-methyloxime, N-methyl-4-pyrazolecarboxaldehyde O-methyloxime, N-methyl-2-pyrrolecarboxaldehyde O-methyloxime, N-methyl-2-imidazolecarboxaldehyde O-methyloxime, N-methyl-indole-3-carboxaldehyde O-methyloxime, N-methyl-1,2,3-triazole-4-carboxaldehyde O-methyloxime, N-methyl-1,2,4-triazole-3-carboxaldehyde O-methyloxime, pyrazinecarboxaldehyde O-methyloxime, 2-thiazolecarboxaldehyde O-methyloxime, 2-thiophenecarboxaldehyde O-methyloxime, 1,3-dimethyl-2-imidazolidinone O-benzyloxime, 2-acetylthiophene O-methyloxime, 2-acetylthiazole O-methyloxime, 2-acetylpyridine O-methyloxime, 3-acetylpyridine O-methyloxime, 4-acetylpyridine O-methyloxime, bis(2-pyridyl)ketone O-methyloxime, 2-acetyl-1-methylpyrrole O-methyloxime, and 3-acetyl-1-methylpyrrole O-methyloxime. Mixtures of the foregoing may be employed.

Specific examples of O-acyloximes include formaldehyde O-acetyloxime, formaldehyde O-benzoyloxime, acetaldehyde O-acetyloxime, propanal O-acetyloxime, butanal O-acetyloxime, pentanal O-acetyloxime, cyclopentanecarboxaldehyde O-acetyloxime, hexanal O-acetyloxime, cyclohexanecarboxaldehyde O-acetyloxime, heptanal O-acetyloxime, cycloheptanecarboxaldehyde O-acetyloxime, octanal O-acetyloxime, cyclooctanecarboxaldehyde O-acetyloxime, nonanal O-acetyloxime, cyclononanecarboxaldehyde O-acetyloxime, benzaldehyde O-acetyloxime, 2-methoxybenzaldehyde O-acetyloxime, 4-diethylaminobenzaldehyde O-acetyloxime, 4-diethylaminobenzaldehyde O-acetyloxime, trans-cinnamaldehyde O-acetyloxime, ferrocenecarboxaldehyde O-acetyloxime, acetylferrocene O-acetyloxime, acetone O-acetyloxime, 2-butanone O-acetyloxime, 2-pentanone O-acetyloxime, 3-pentanone O-acetyloxime, 2-hexanone O-acetyloxime, 3-hexanone O-acetyloxime, 2-heptanone O-acetyloxime, 3-heptanone O-acetyloxime, 4-heptanone O-acetyloxime, 2-octanone O-acetyloxime, 3-octanone O-acetyloxime, 2-nonanone O-acetyloxime, 3-nonanone O-acetyloxime, 5-nonanone O-acetyloxime, acetophenone O-acetyloxime, benzophenone O-acetyloxime, 4,4'-bis(diethylamino)benzophenone O-acetyloxime, cyclobutanone O-acetyloxime, cyclopentanone O-acetyloxime, cyclohexanone O-acetyloxime, cycloheptanone O-acetyloxime, cyclooctanone O-acetyloxime, cyclononanone O-acetyloxime, cyclodecanone O-acetyloxime, cycloundecanone O-acetyloxime, cyclododecanone O-acetyloxime, and cyclotridecanone O-acetyloxime, benzophenone O-acetyloxime, 4,4'-bis(diethylamino)benzophenone O-acetyloxime, 2-pyridinecarboxaldehyde O-acetyloxime, 2-pyridinecarboxaldehyde O-acetyloxime, tetrahydrofuran-3-carboxaldehyde O-acetyloxime, 2-furancarboxaldehyde O-acetyloxime, 3-furancarboxaldehyde O-acetyloxime, N-methyl-4-pyrazolecarboxaldehyde O-acetyloxime, N-methyl-2-pyrrolecarboxaldehyde O-acetyloxime, N-methyl-2-imidazolecarboxaldehyde O-acetyloxime, N-methyl-indole-3-carboxaldehyde O-acetyloxime, N-methyl-1,2,3-triazole-4-carboxaldehyde O-acetyloxime, N-methyl-1,2,4-triazole-3-carboxaldehyde O-acetyloxime, pyrazinecarboxaldehyde O-acetyloxime, 2-thiazolecarboxaldehyde O-acetyloxime, 2-thiophenecarboxaldehyde O-acetyloxime, 1,3-dimethyl-2-imidazolidinone O-acetyloxime, 2-acetylthiophene O-acetyloxime, 2-acetylthiazole O-acetyloxime, 2-acetylpyridine O-acetyloxime, 3-acetylpyridine O-acetyloxime, 4-acetylpyridine O-acetyloxime, bis(2-pyridyl)ketone O-acetyloxime, 2-acetyl-1-methylpyrrole O-acetyloxime, and 3-acetyl-1-methylpyrrole O-acetyloxime. Mixtures of the foregoing may be employed.

Specific examples of O-sulfonyloximes include formaldehyde O-benzenesulfonyloxime, formaldehyde O-trifluoromethanesulfonyloxime, acetaldehyde O-benzenesulfonyloxime, acetaldehyde O-benzenesulfonyloxime, propanal O-benzenesulfonyloxime, butanal O-benzenesulfonyloxime, pentanal O-benzenesulfonyloxime, cyclopentanecarboxaldehyde O-benzenesulfonyloxime, hexanal O-benzenesulfonyloxime, cyclohexanecarboxaldehyde O-benzenesulfonyloxime, heptanal O-benzenesulfonyloxime, cycloheptanecarboxaldehyde O-benzenesulfonyloxime, octanal O-benzenesulfonyloxime, cyclooctanecarboxaldehyde O-benzenesulfonyloxime, nonanal O-benzenesulfonyloxime, cyclononanecarboxaldehyde O-benzenesulfonyloxime, benzaldehyde O-benzenesulfonyloxime, benzaldehyde O-trifluoromethanesulfonyloxime, 2-methoxybenzaldehyde O-benzenesulfonyloxime, 4-diethylaminobenzaldehyde O-benzenesulfonyloxime, 4-diethylaminobenzaldehyde O-benzenesulfonyloxime, trans-cinnamaldehyde O-benzenesulfonyloxime, ferrocenecarboxaldehyde O-benzenesulfonyloxime, acetylferrocene O-benzenesulfonyloxime, acetone O-benzenesulfonyloxime, 2-butanone O-benzenesulfonyloxime, 2-pentanone O-benzenesulfonyloxime, 2-pentanone O-benzenesulfonyloxime, 2-hexanone O-benzenesulfonyloxime, 3-hexanone O-benzenesulfonyloxime, 2-heptanone O-benzenesulfonyloxime, 3-heptanone O-benzenesulfonyloxime, 4-heptanone O-benzenesulfonyloxime, 2-octanone O-benzenesulfonyloxime, 3-octanone O-benzenesulfonyloxime, 2-nonanone O-benzenesulfonyloxime, 3-nonanone O-benzenesulfonyloxime, 5-nonanone O-benzenesulfonyloxime, acetophenone O-benzenesulfonyloxime, benzophenone O-benzenesulfonyloxime, 4,4'-bis(diethylamino)benzophenone O-benzenesulfonyloxime, cyclobutanone O-benzenesulfonyloxime, cyclopentanone O-benzenesulfonyloxime, cyclohexanone O-benzenesulfonyloxime, cycloheptanone O-benzenesulfonyloxime, cyclooctanone O-benzenesulfonyloxime, cyclononanone O-benzenesulfonyloxime, cyclodecanone O-benzenesulfonyloxime, cycloundecanone O-benzenesulfonyloxime, cyclododecanone O-benzenesulfonyloxime, and cyclotridecanone O-benzenesulfonyloxime, benzophenone O-benzenesulfonyloxime, 4,4'-bis(diethylamino)benzophenone O-benzenesulfonyloxime, 2-pyridinecarboxaldehyde O-benzenesulfonyloxime, 2-pyridinecarboxaldehyde O-benzenesulfonyloxime, tetrahydrofuran-3-carboxaldehyde O-benzenesulfonyloxime, 2-furancarboxaldehyde O-benzenesulfonyloxime, 3-furancarboxaldehyde O-benzenesulfonyloxime, N-methyl-4-pyrazolecarboxaldehyde O-benzenesulfonyloxime, N-methyl-2-pyrrolecarboxaldehyde O-benzenesulfonyloxime, N-methyl-2-imidazolecarboxaldehyde O-benzenesulfonyloxime, N-methyl-indole-3-carboxaldehyde O-benzenesulfonyloxime, N-methyl-1,2,3-triazole-4-carboxaldehyde O-benzenesulfonyloxime, N-methyl-1,2,4-triazole-3-carboxaldehyde O-benzenesulfonyloxime, pyrazinecarboxaldehyde O-benzenesulfonyloxime, 2-thiazolecarboxaldehyde O-benzenesulfonyloxime, 2-thiophenecarboxaldehyde O-benzenesulfonyloxime, 1,3-dimethyl-2-imidazolidinone O-benzenesulfonyloxime, 2-acetylthiophene O-benzenesulfonyloxime, 2-acetylthiazole O-benzenesulfonyloxime, 2-acetylpyridine O-benzenesulfonyloxime, 3-acetylpyridine O-benzenesulfonyloxime, 4-acetylpyridine O-benzenesulfonyloxime, 2-acetylthiazole O-benzenesulfonyloxime, 2-acetyl-1-methylpyrrole O-benzenesulfonyloxime, and 3-acetyl-1-methylpyrrole O-benzenesulfonyloxime. Mixtures of the foregoing may be employed.

Specific examples of O-silyloximes include formaldehyde O-trimethylsilyloxime, acetaldehyde O-trimethylsilyloxime, butanal O-trimethylsilyloxime, benzaldehyde O-trimethylsilyloxime, 2-methoxybenzaldehyde O-trimethylsilyloxime, 4-diethylaminobenzaldehyde O-trimethylsilyloxime, trans-cinnamaldehyde O-trimethylsilyloxime, ferrocenecarboxaldehyde O-trimethylsilyloxime, acetone O-trimethylsilyloxime, 2-butanone O-trimethylsilyloxime, acetophenone O-trimethylsilyloxime, benzophenone O-trimethylsilyloxime, 4,4'-bis(diethylamino)benzophenone O-trimethylsilyloxime, cyclobutanone O-trimethylsilyloxime, cyclopentanone O-trimethylsilyloxime, cyclohexanone O-trimethylsilyloxime, 2-pyridinecarboxaldehyde O-trimethylsilyloxime, tetrahydrofuran-3-carboxaldehyde O-trimethylsilyloxime, N-methyl-4-pyrazolecarboxaldehyde O-trimethylsilyloxime, N-methyl-2-imidazolecarboxaldehyde O-trimethylsilyloxime, N-methyl-indole-3-carboxaldehyde O-trimethylsilyloxime, N-methyl-1,2,3-triazole-4-carboxaldehyde O-trimethylsilyloxime, pyrazinecarboxaldehyde O-trimethylsilyloxime, 2-thiazolecarboxaldehyde O-trimethylsilyloxime, 2-thiophenecarboxaldehyde O-trimethylsilyloxime, 1,3-dimethyl-2-imidazolidinone O-trimethylsilyloxime, 2-acetylthiophene O-trimethylsilyloxime, 2-acetylthiazole O-trimethylsilyloxime, 2-acetylpyridine O-trimethylsilyloxime, 2-acetyl-1-methylpyrrole O-trimethylsilyloxime, formaldehyde O-triphenylsilyloxime, acetaldehyde O-triphenylsilyloxime, butanal O-triphenylsilyloxime, benzaldehyde O-triphenylsilyloxime, 2-methoxybenzaldehyde O-triphenylsilyloxime, 4-diethylaminobenzaldehyde O-triphenylsilyloxime, trans-cinnamaldehyde O-triphenylsilyloxime, ferrocenecarboxaldehyde O-triphenylsilyloxime, acetone O-triphenylsilyloxime, 2-butanone O-triphenylsilyloxime, acetophenone O-triphenylsilyloxime, benzophenone O-triphenylsilyloxime, 4,4'-bis(diethylamino)benzophenone O-triphenylsilyloxime, cyclobutanone O-triphenylsilyloxime, cyclopentanone O-triphenylsilyloxime, cyclohexanone O-triphenylsilyloxime, 2-pyridinecarboxaldehyde O-triphenylsilyloxime, tetrahydrofuran-3-carboxaldehyde O-triphenylsilyloxime, N-methyl-4-pyrazolecarboxaldehyde O-triphenyllsilyloxime, N-methyl-2-imidazolecarboxaldehyde O-triphenylsilyloxime, N-methyl-indole-3-carboxaldehyde O-triphenylsilyloxime, N-methyl-1,2,3-triazole-4-carboxaldehyde O-triphenylsilyloxime, pyrazinecarboxaldehyde O-triphenylsilyloxime, 2-thiazolecarboxaldehyde O-trimphenylsilyloxime, 2-thiophenecarboxaldehyde O-triphenylsilyloxime, 1,3-dimethyl-2-imidazolidinone O-triphenylsilyloxime, 2-acetylthiophene O-triphenylsilyloxime, 2-acetylthiazole O-triphenylsilyloxime, 2-acetylpyridine O-triphenylsilyloxime, 2-acetyl-1-methylpyrrole O-triphenylsilyloxime, formaldehyde O-tribenzyllsilyloxime, acetaldehyde O-tribenzylsilyloxime, butanal O-tribenzylsilyloxime, benzaldehyde O-tribenzylsilyloxime, 2-methoxybenzaldehyde O-tribenzylsilyloxime, 4-diethylaminobenzaldehyde O-tribenzylsilyloxime, trans-cinnamaldehyde O-tribenzylsilyloxime, ferrocenecarboxaldehyde O-tribenzylsilyloxime, acetone O-tribenzylsilyloxime, 2-butanone O-tribenzylsilyloxime, acetophenone O-tribenzylsilyloxime, benzophenone O-tribenzyllsilyloxime, 4,4'-bis(diethylamino)benzophenone O-tribenzylsilyloxime, cyclobutanone O-tribenzylsilyloxime, cyclopentanone O-tribenzylsilyloxime, cyclohexanone O-tribenzylsilyloxime, 2-pyridinecarboxaldehyde O-tribenzylsilyloxime, tetrahydrofuran-3-carboxaldehyde O-tribenzylsilyloxime, N-methyl-4-pyrazolecarboxaldehyde O-tribenzylsilyloxime, N-methyl-2-imidazolecarboxaldehyde O-tribenzylsilyloxime, N-methyl-indole-3-carboxaldehyde O-tribenzylsilyloxime, N-methyl-1,2,3-triazole-4-carboxaldehyde O-tribenzylsilyloxime, pyrazinecarboxaldehyde O-tribenzylsilyloxime, 2-thiazolecarboxaldehyde O-tribenzylsilyloxime, 2-thiophenecarboxaldehyde O-tribenzylsilyloxime, 1,3-dimethyl-2-imidazolidinone O-tribenzylsilyloxime, 2-acetylthiophene O-tribenzylsilyloxime, 2-acetylthiazole O-tribenzylsilyloxime, 2-acetylpyridine O-tribenzylsilyloxime, 2-acetyl-1-methylpyrrole O-tribenzylsilyloxime, formaldehyde O-dimethylhydrosilyloxime, acetaldehyde O-dimethylhydrosilyloxime, butanal O-dimethylhydrosilyloxime, benzaldehyde O-dimethylhydrosilyloxime, 2-methoxybenzaldehyde O-dimethylhydrosilyloxime, 4-diethylaminobenzaldehyde O-dimethylhydrosilyloxime, trans-cinnamaldehyde O-dimethylhydrosilyloxime, ferrocenecarboxaldehyde O-dimethylhydrosilyloxime, acetone O-dimethylhydrosilyloxime, 2-butanone O-dimethylhydrosilyloxime, acetophenone O-dimethylhydrosilyloxime, benzophenone O-dimethylhydrosilyloxime, 4,4'-bis(diethylamino)benzophenone O-dimethylhydrosilyloxime, cyclobutanone O-dimethylhydrosilyloxime, cyclopentanone O-dimethylhydrosilyloxime, cyclohexanone O-dimethylhydrosilyloxime, 2-pyridinecarboxaldehyde O-dimethylhydrosilyloxime, tetrahydrofuran-3-carboxaldehyde O-dimethylhydrosilyloxime, N-methyl-4-pyrazolecarboxaldehyde O-dimethylhydrosilyloxime, N-methyl-2-imidazolecarboxaldehyde O-dimethylhydrosilyloxime, N-methyl-indole-3-carboxaldehyde O-dimethylhydrosilyloxime, N-methyl-1,2,3-triazole-4-carboxaldehyde O-dimethylhydrosilyloxime, pyrazinecarboxaldehyde O-dimethylhydrosilyloxime, 2-thiazolecarboxaldehyde O-dimethylhydrosilyloxime, 2-thiophenecarboxaldehyde O-dimethylhydrosilyloxime, 1,3-dimethyl-2-imidazolidinone O-dimethylhydrosilyloxime, 2-acetylthiophene O-dimethylhydrosilyloxime, 2-acetylthiazole O-dimethylhydrosilyloxime, 2-acetylpyridine O-dimethylhydrosilyloxime, 2-acetyl-1-methylpyrrole O-dimethylhydrosilyloxime, formaldehyde O-diisopropylhydrosilyloxime, acetaldehyde O-diisopropylhydrosilyloxime, butanal O-diisopropylhydrosilyloxime, benzaldehyde O-diisopropylhydrosilyloxime, 2-methoxybenzaldehyde O-diisopropylhydrosilyloxime, 4-diethylaminobenzaldehyde O-diisopropylhydrosilyloxime, trans-cinnamaldehyde O-diisopropylhydrosilyloxime, ferrocenecarboxaldehyde O-diisopropylhydrosilyloxime, acetone O-diisopropylhydrosilyloxime, 2-butanone O-diisopropylhydrosilyloxime, acetophenone O-diisopropylhydrosilyloxime, benzophenone O-diisopropylhydrosilyloxime, 4,4'-bis(diethylamino)benzophenone O-diisopropylhydrosilyloxime, cyclobutanone O-diisopropylhydrosilyloxime, cyclopentanone O-diisopropylhydrosilyloxime, cyclohexanone O-diisopropylhydrosilyloxime, 2-pyridinecarboxaldehyde O-diisopropylhydrosilyloxime, tetrahydrofuran-3-carboxaldehyde O-diisopropylhydrosilyloxime, N-methyl-4-pyrazolecarboxaldehyde O-diisopropylhydrosilyloxime, N-methyl-2-imidazolecarboxaldehyde O-diisopropylhydrosilyloxime, N-methyl-indole-3-carboxaldehyde O-diisopropylhydrosilyloxime, N-methyl-1,2,3-triazole-4-carboxaldehyde O-diisopropylhydrosilyloxime, pyrazinecarboxaldehyde O-diisopropylhydrosilyloxime, 2-thiazolecarboxaldehyde O-diisopropylhydrosilyloxime, 2-thiophenecarboxaldehyde O-diisopropylhydrosilyloxime, 1,3-dimethyl-2-imidazolidinone O-diisopropylhydrosilyloxime, 2-acetylthiophene O-diisopropylhydrosilyloxime, 2-acetylthiazole O-diisopropylhydrosilyloxime, 2-acetylpyridine O-diisopropylhydrosilyloxime, 2-acetyl-1-methylpyrrole O-diisopropylhydrosilyloxime, tetrakis(methylethylketoximino)silane, vinyltris(methylethylketoximino)silane, vinylmethylbis(methylethylketoximino)silane, and (methylethylketoximino)trimethylsilane. Mixtures of the foregoing may be employed.

In one or more embodiments, the pseudo-living polymer and the protected oxime compound can be reacted by combining or mixing them together. For example, where the pseudo-living polymer is synthesized in solution, the protected oxime compound can be added to the solution in which the pseudo-living polymer is prepared. In one or more embodiments, the protected oxime compound can be reacted with the pseudo-living polymer before the pseudo-living polymer is quenched. In one or more embodiments, the reaction between the protected oxime compound and the pseudo-living polymer may take place within 30 minutes, in other embodiments within 5 minutes, and in other embodiments within one minute of reaching the peak polymerization temperature resulting from the synthesis of the pseudo-living polymer. In one or more embodiments, the reaction between the pseudo-living polymer and the protected oxime compound can occur at the peak polymerization temperature. In other embodiments, the reaction between the pseudo-living polymer and the protected oxime compound can occur after the pseudo-living polymer has been stored. In one or more embodiments, the storage of the pseudo-living polymer occurs at room temperature or below under an inert atmosphere. In one or more embodiments, the reaction between the protected oxime compound and the pseudo-living polymer may take place at a temperature from about 10° C. to about 150° C., and in other embodiments from about 20° C. to about 100° C.

The amount of the protected oxime compound that can be reacted with the pseudo-living polymer may vary depending on the desired degree of functionalization. In one or more embodiments, the amount of the protected oxime compound employed can be described with reference to the lanthanide metal of the lanthanide compound. For example, the molar ratio of the protected oxime compound to the lanthanide metal may be from about 1:1 to about 200:1, in other embodiments from 5:1 to 150:1, and in other embodiments from 10:1 to 100:1.

In one or more embodiments, after the reaction between the pseudo-living polymer and the protected oxime compound has been accomplished or completed, a quenching agent can be added to the polymerization mixture in order to inactivate any residual reactive polymer chains and the catalyst or catalyst components. The quenching agent may include a protic compound, which includes, but is not limited to, an alcohol, a carboxylic acid, an inorganic acid, water, or a mixture thereof. An antioxidant such as 2,6-di-tert-butyl-4-methylphenol may be added along with, before, or after the addition of the quenching agent. The amount of the antioxidant employed may be in the range of 0.2% to 1% by weight of the polymer product.

When the polymerization mixture has been quenched, the polymer product can be recovered from the polymerization mixture by using any conventional procedures of desolventization and drying that are known in the art. For instance, the polymer can be recovered by subjecting the polymer cement to steam desolventization, followed by drying the resulting polymer crumbs in a hot air tunnel. Alternatively, the polymer may be recovered by directly drying the polymer cement on a drum dryer. The content of the volatile substances in the dried polymer can be below 1%, and in other embodiments below 0.5% by weight of the polymer.

Where cis-1,4-polydienes are prepared, they can have a cis-1,4-linkage content that is greater than about 60%, in other embodiments greater than about 75%, in other embodiments greater than about 90%, and in other embodiments greater than about 95%. Also, these polymers may have a 1,2-linkage content that is less than about 7%, in other embodiments less than 5%, in other embodiments less than 2%, and in other embodiments less than 1%. The cis-1,4- and 1,2-linkage contents can be determined by infrared spectroscopy. The number average molecular weight ($M_n$) of the polymers may be from about 5,000 to about 200,000, in other embodiments from about 25,000 to about 150,000, and in other embodiments from about 50,000 to about 120,000, as determined by using gel permeation chromatography (GPC) calibrated with polystyrene standards and Mark-Houwink constants for polybutadiene. The polydispersity of the polymers may be from about 1.5 to about 5.0, and in other embodiments from about 2.0 to about 4.0.

The functionalized polymers of this invention are particularly useful in preparing tire components. These tire components can be prepared by using the functionalized polymers of this invention alone or together with other rubbery polymers. Other rubbery polymers that may be used include natural and synthetic elastomers. The synthetic elastomers typically derive from the polymerization of conjugated diene monomers. These conjugated diene monomers may be copolymerized with other monomers such as vinyl aromatic monomers. Other rubbery polymers may derive from the polymerization of ethylene together with one or more α-olefins and optionally one or more diene monomers.

Useful rubbery polymers include natural rubber, synthetic polyisoprene, polybutadiene, polyisobutylene-co-isoprene, neoprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof These elastomers can have a myriad of macromolecular structures including linear, branched and star shaped. Other ingredients that are typically employed in rubber compounding may also be added.

The rubber compositions may include fillers such as inorganic and organic fillers. The organic fillers include carbon black and starch. The inorganic fillers may include silica, aluminum hydroxide, magnesium hydroxide, clays (hydrated aluminum silicates), and mixtures thereof.

A multitude of rubber curing agents (also called vulcanizing agents) may be employed, including sulfur or peroxide-based curing systems. Curing agents are described in *Kirk-Othmer*, ENCYCLOPEDIA OF CHEMICAL TECHNOLOGY, Vol. 20, pgs. 365-468, ($3^{rd}$ Ed. 1982), particularly *Vulcanization Agents and Auxiliary Materials*, pgs. 390-402, and A. Y. Coran, *Vulcanization*, ENCYCLOPEDIA OF POLYMER SCIENCE AND ENGINEERING, ($2^{nd}$ Ed. 1989), which are incorporated herein by reference. Vulcanizing agents may be used alone or in combination.

Other ingredients that may be employed include accelerators, oils, waxes, scorch inhibiting agents, processing aids, zinc oxide, tackifying resins, reinforcing resins, fatty acids such as stearic acid, peptizers, and one or more additional rubbers.

These rubber compositions are useful for forming tire components such as treads, subtreads, black sidewalls, body ply skins, bead filler, and the like. Preferably, the functional polymers are employed in tread and sidewall formulations. In one or more embodiments, these tread formulations may include from about 10% to about 100% by weight, in other embodiments from about 35% to about 90% by weight, and in other embodiments from about 50% to 80% by weight of the functionalized polymer based on the total weight of the rubber within the formulation.

In one or more embodiments, the vulcanizable rubber composition may be prepared by forming an initial masterbatch that includes the rubber component and filler (the rubber component optionally including the functionalized polymer of this invention). This initial masterbatch may be mixed at a starting temperature of from about 25° C. to about 125° C. with a discharge temperature of about 135° C. to about 180° C. To prevent premature vulcanization (also known as scorch), this initial masterbatch may exclude vulcanizing agents. Once the initial masterbatch is processed, the vulcanizing agents may be introduced and blended into the initial masterbatch at low temperatures in a final mixing stage, which preferably does not initiate the vulcanization process. Optionally, additional mixing stages, sometimes called remills, can be employed between the masterbatch mixing stage and the final mixing stage. Various ingredients including the functionalized polymer of this invention can be added during these remills. Rubber compounding techniques and the additives employed therein are generally known as disclosed in *The Compounding and Vulcanization of Rubber*, in *Rubber Technology* ($2^{nd}$ Ed. 1973).

The mixing conditions and procedures applicable to silica-filled tire formulations are also well known as described in U.S. Pat. Nos. 5,227,425, 5,719,207, 5,717,022, and European Patent No. 890,606, all of which are incorporated herein by reference. In one or more embodiments, where silica is employed as a filler (alone or in combination with other fillers), a coupling and/or shielding agent may be added to the rubber formulation during mixing. Useful coupling and shielding agents are disclosed in U.S. Pat. Nos. 3,842,111, 3,873,489, 3,978,103, 3,997,581, 4,002,594, 5,580,919, 5,583,245, 5,663,396, 5,674,932, 5,684,171, 5,684,172 5,696,197, 6,608,145, 6,667,362, 6,579,949, 6,590,017, 6,525,118, 6,342,552, and 6,683,135, which are incorporated herein by reference. In one embodiment, the initial masterbatch is prepared by including the functionalized polymer of this invention and silica in the substantial absence of coupling and shielding agents.

Where the vulcanizable rubber compositions are employed in the manufacture of tires, these compositions can be processed into tire components according to ordinary tire manufacturing techniques including standard rubber shaping, molding and curing techniques. Typically, vulcanization is effected by heating the vulcanizable composition in a mold; e.g., it may be heated to about 140 to about 180° C. Cured or crosslinked rubber compositions may be referred to as vulcanizates, which generally contain three-dimensional polymeric networks that are thermoset. The other ingredients, such as processing aides and fillers, may be evenly dispersed throughout the vulcanized network. Pneumatic tires can be made as discussed in U.S. Pat. Nos. 5,866,171, 5,876,527, 5,931,211, and 5,971,046, which are incorporated herein by reference.

In order to demonstrate the practice of the present invention, the following examples have been prepared and tested. The examples should not, however, be viewed as limiting the scope of the invention. The claims will serve to define the invention.

EXAMPLES

Example 1

Synthesis of Unmodified cis-1,4-Polybutadiene
(Control Polymer)

To a 2-gallon reactor equipped with turbine agitator blades was added 1403 g of hexane and 3083 g of 20.6 wt % butadiene in hexane. A preformed catalyst was prepared by mixing 7.35 ml of 4.32 M methylaluminoxane in toluene, 1.66 g of 20.6 wt % 1,3-butadiene in hexane, 0.59 ml of 0.537 M neodymium versatate in cyclohexane, 6.67 ml of 1.0 M diisobutylaluminum hydride in hexane, and 1.27 ml of 1.0 M diethylaluminum chloride in hexane. The catalyst was aged for 15 minutes and charged into the reactor. The reactor jacket temperature was then set to 65° C. Fifty three minutes after addition of the catalyst, the polymerization mixture was cooled to room temperature. The resulting polymer cement was coagulated with 12 liters of isopropanol containing 5 g of 2,6-di-tert-butyl-4-methylphenol and then drum-dried. The Mooney viscosity ($ML_{1+4}$) of the polymer was determined to be 29.4 at 100° C. by using a Monsanto Mooney viscometer with a large rotor, a one-minute warm-up time, and a four-minute running time. As determined by gel permeation chromatography (GPC), the polymer had a number average molecular weight ($M_n$) of 116,900, a weight average molecular weight ($M_w$) of 217,200, and a molecular weight distribution ($M_w/M_n$) of 1.86. The infrared spectroscopic analysis of the polymer indicated a cis-1,4-linkage content of 94.5%, a trans-1,4-linkage content of 5.0%, and a 1,2-linkage content of 0.5%.

Example 2

Synthesis of Unmodified cis-1,4-Polybutadiene
(Control Polymer)

To a 2-gallon reactor equipped with turbine agitator blades was added 1651 g of hexane and 2835 g of 22.4 wt % butadiene in hexane. A preformed catalyst was prepared by mixing 5.88 ml of 4.32 M methylaluminoxane in toluene, 1.22 g of 22.4 wt % 1,3-butadiene in hexane, 0.47 ml of 0.537 M neodymium versatate in cyclohexane, 5.33 ml of 1.0 M diisobutylaluminum hydride in hexane, and 1.02 ml of 1.0 M diethylaluminum chloride in hexane. The catalyst was aged for 15 minutes and charged into the reactor. The reactor jacket temperature was then set to 65° C. Seventy minutes after addition of the catalyst, the polymerization mixture was cooled to room temperature. The resulting polymer cement was coagulated with 12 liters of isopropanol containing 5 g of 2,6-di-tert-butyl-4-methylphenol and then drum-dried. The resulting polymer had the following properties: $ML_{1+4}$=44.2, $M_n$=129,900, $M_w$=261,200, $M_w/M_n$=2.01, cis-1,4-linkage=95.0%, trans-1,4-linkage=4.5%, and 1,2-linkage=0.5%.

Example 3

Synthesis of cis-1,4-Polybutadiene Modified with Formaldehyde O-Benzyloxime (FBO)

To a 2-gallon reactor equipped with turbine agitator blades was added 1586 g of hexane and 2900 g of 21.9 wt % butadiene in hexane. A preformed catalyst was prepared by mixing 7.35 ml of 4.32 M methylaluminoxane in toluene, 1.57 g of 21.9 wt % 1,3-butadiene in hexane, 0.59 ml of 0.537 M neodymium versatate in cyclohexane, 6.67 ml of 1.0 M diisobutylaluminum hydride in hexane, and 1.27 ml of 1.0 M diethylaluminum chloride in hexane. The catalyst was aged for 15 minutes and charged into the reactor. The reactor jacket temperature was then set to 65° C. Fifty seven minutes after addition of the catalyst, the polymerization mixture was cooled to room temperature. 430 g of the resulting living polymer cement was transferred from the reactor to a nitrogen-purged bottle, followed by addition of 1.81 ml of 1.00 M formaldehyde O-benzyloxime (FBO) in hexane. The bottle was tumbled for 35 minutes in a water bath maintained at 65° C. The resulting mixture was coagulated with 3 liters of isopropanol containing 0.5 g of 2,6-di-tert-butyl-4-methylphenol and then drum-dried to give a modified polymer that had the following properties: $ML_{1+4}$=37.5, $M_n$=140,100, $M_w$=231,600, $M_w/M_n$=1.65, cis-1,4-linkage=94.3%, trans-1,4-linkage=5.2%, and 1,2-linkage=0.5%.

Examples 4-6

Compounding Evaluation of FBO-Modified Polymer vs. Unmodified Polymer

The polymer samples produced in Examples 1-3 were evaluated in a carbon black filled rubber compound. The compositions of the vulcanizates are presented in Table 1; the numbers in the table are expressed as parts per hundred parts by weight of rubber (phr).

TABLE 1

| | Example No. | | |
|---|---|---|---|
| | 4 | 5 | 6 |
| Polymer used | Example 1 | Example 2 | Example 3 |
| Polymer type | unmodified | unmodified | FBO-modified |
| Polymer | 80 | 80 | 80 |
| Polyisoprene | 20 | 20 | 20 |
| Carbon black (N339) | 50 | 50 | 50 |
| Oil | 10 | 10 | 10 |
| Wax | 2 | 2 | 2 |
| Antioxidant | 1 | 1 | 1 |
| Zinc oxide | 2.5 | 2.5 | 2.5 |
| Stearic acid | 2 | 2 | 2 |

TABLE 1-continued

| | Example No. | | |
|---|---|---|---|
| | 4 | 5 | 6 |
| Accelerators | 1.3 | 1.3 | 1.3 |
| Sulfur | 1.5 | 1.5 | 1.5 |
| Total | 170.3 | 170.3 | 170.3 |

The Mooney viscosity ($ML_{1+4}$) of the uncured compound was determined at 130° C. by using a Alpha Technologies Mooney viscometer with a large rotor, a one-minute warm-up time, and a four-minute running time. The tensile mechanical properties of the vulcanizates were measured by using the standard procedure described in ASTM-$D_{412}$. The Payne effect data ($\Delta G'$) and hysteresis data (tan $\delta$) of the vulcanizates were obtained from a dynamic strain sweep experiment, which was conducted at 50° C. and 1 Hz with strain sweeping from 0.25% to 14%. $\Delta G'$ is the difference between G' at 0.25% strain and G' at 14% strain. The physical properties of the vulcanizates are summarized in Table 2.

TABLE 2

| | Example No. | | |
|---|---|---|---|
| | 4 | 5 | 6 |
| Polymer type | Unmodified | unmodified | FBO-modified |
| Compound ML at 130° C. | 52.7 | 66.0 | 62.4 |
| 300% Modulus at 23° C. (MPa) | 8.97 | 8.74 | 8.52 |
| $T_b$ at 23° C. (MPa) | 12.5 | 13.8 | 17.3 |
| $E_b$ at 23° C. (%) | 376 | 406 | 484 |
| $\Delta G'$ (MPa) | 2.26 | 1.93 | 1.26 |
| tan$\delta$ at 50° C., 3% strain | 0.137 | 0.129 | 0.102 |

As can be seen in Table 2, the FBO-modified polymer shows lower tan $\delta$ at 50° C. than the unmodified polymer, indicating that FBO modification of the polymer reduces hysteresis. The FBO-modified polymer also gives lower $\Delta G'$ than the unmodified polymer, indicating that the Payne Effect has been reduced due to the stronger interaction between the FBO-modified polymer and carbon black.

Various modifications and alterations that do not depart from the scope and spirit of this invention will become apparent to those skilled in the art. This invention is not to be duly limited to the illustrative embodiments set forth herein.

What is claimed is:

1. A method for preparing a functionalized polymer, the method comprising the steps of:
   (i) polymerizing conjugated diene monomer by employing a lanthanide-based catalyst to form a reactive polymer having a reactive chain end; and
   (ii) reacting the reactive chain end with a protected oxime compound selected from the group consisting of formaldehyde O-benzyloxime, acetaldehyde O-benzyloxime, acetaldehyde O-methyloxime, propanal O-benzyloxime, butanal O-methyloxime, pentanal O-methyloxime, cyclopentanecarboxaldehyde O-methyloxime, hexanal O-methyloxime, cyclohexanecarboxaldehyde O-methyloxime, heptanal O-methyloxime, cycloheptanecarboxaldehyde O-methyloxime, octanal O-methyloxime, cyclooctanecarboxaldehyde O-methyloxime, nonanal O-methyloxime, cyclononanecarboxaldehyde O-methyloxime, benzaldehyde O-methyloxime, 2-methoxybenzaldehyde O-methyloxime, 4-diethylaminobenzaldehyde O-methyloxime, 4-diethylaminobenzaldehyde O-benzyloxime, trans-cinnamaldehyde O-benzyloxime, ferrocenecarboxaldehyde O-methyloxime, acetylferrocene O-methyloxime, acetone O-methyloxime, 2-butanone O-methyloxime, 2-pentanone O-methyloxime, 3-pentanone O-methyloxime, 2-hexanone O-methyloxime, 3-hexanone O-methyloxime, 2-heptanone O-methyloxime, 3-heptanone O-methyloxime, 4-heptanone O-methyloxime, 2-octanone O-methyloxime, 3-octanone O-methyloxime, 2-nonanone O-methyloxime, 3-nonanone O-methyloxime, 5-nonanone O-methyloxime, acetophenone O-methyloxime, benzophenone O-methyloxime, 4,4'-bis(diethylamino)benzophenone O-methyloxime, cyclobutanone O-methyloxime, cyclopentanone O-methyloxime, cyclohexanone O-methyloxime, cycloheptanone O-methyloxime, cyclooctanone O-methyloxime, cyclononanone O-methyloxime, cyclodecanone O-methyloxime, cycloundecanone O-methyloxime, cyclododecanone O-methyloxime, and cyclotridecanone O-methyloxime, benzophenone O-methyloxime, 4,4'-bis(diethylamino) benzophenone O-methyloxime, 2-pyridinecarboxaldehyde O-methyloxime, 2-pyridinecarboxaldehyde O-allyloxime, tetrahydrofuran-3-carboxaldehyde O-methyloxime, 2-furancarboxaldehyde O-methyloxime, 3-furancarboxaldehyde O-methyloxime, N-methyl-4-pyrazolecarboxaldehyde O-methyloxime, N-methyl-2-pyrrolecarboxaldehyde O-methyloxime, N-methyl-2-imidazolecarboxaldehyde O-methyloxime, N-methyl-indole-3-carboxaldehyde O-methyloxime, N-methyl-1,2,3-triazole-4-carboxaldehyde O-methyloxime, N-methyl-1,2,4-triazole-3-carboxaldehyde O-methyloxime, pyrazinecarboxaldehyde O-methyloxime, 2-thiazolecarboxaldehyde O-methyloxime, 2-thiophenecarboxaldehyde O-methyloxime, 1,3-dimethyl-2-imidazolidinone O-benzyloxime, 2-acetylthiophene O-methyloxime, 2-acetylthiazole O-methyloxime, 2-acetylpyridine O-methyloxime, 3-acetylpyridine O-methyloxime, 4-acetylpyridine O-methyloxime, bis(2-pyridyl)ketone O-methyloxime, 2-acetyl-1-methylpyrrole O-methyloxime, 3-acetyl-1-methylpyrrole O-methyloxime, and mixtures thereof.

2. The method of claim 1, where the molar ratio of the protected oxime compound to the lanthanide metal of the lanthanide-based catalyst is from about 1:1 to about 200:1.

3. The method of claim 1, where the lanthanide-based catalyst is formed by combining a lanthanide compound, an alkylating agent, and optionally a halogen-containing compound, with the proviso that the lanthanide compound or the alkylating agent includes a labile halogen atom in the absence of the optional halogen-containing compound.

4. The method of claim 3, where the alkylating agent includes an aluminoxane and an organoaluminum compound represented by the formula $AlR_nX_{3-n}$, where each R, which may be the same or different, is a mono-valent organic group that is attached to the aluminum atom via a carbon atom, where each X, which may be the same or different, is a hydrogen atom, a halogen atom, a carboxylate group, an alkoxide group, or an aryloxide group, and where n is an integer of 1 to 3.

5. The method of claim 1, where said step of reacting the reactive polymer with a protected oxime compound occurs before the reactive polymer is quenched.

6. A method for preparing a functionalized polymer, the method comprising the steps of:
(i) polymerizing conjugated diene monomer by employing a lanthanide-based catalyst to form a reactive polymer having a reactive chain end; and
(ii) reacting the reactive chain end with a protected oxime compound selected from the group consisting of formaldehyde O-acetyloxime, formaldehyde O-benzoyloxime, acetaldehyde O-acetyloxime, propanal O-acetyloxime, butanal O-acetyloxime, pentanal O-acetyloxime, cyclopentanecarboxaldehyde O-acetyloxime, hexanal O-acetyloxime, cyclohexanecarboxaldehyde O-acetyloxime, heptanal O-acetyloxime, cycloheptanecarboxaldehyde O-acetyloxime, octanal O-acetyloxime, cyclooctanecarboxaldehyde O-acetyloxime, nonanal O-acetyloxime, cyclononanecarboxaldehyde O-acetyloxime, benzaldehyde O-acetyloxime, 2-methoxybenzaldehyde O-acetyloxime, 4-diethylaminobenzaldehyde O-acetyloxime, 4-diethylaminobenzaldehyde O-acetyloxime, trans-cinnamaldehyde O-acetyloxime, ferrocenecarboxaldehyde O-acetyloxime, acetylferrocene O-acetyloxime, acetone O-acetyloxime, 2-butanone O-acetyloxime, 2-pentanone O-acetyloxime, 3-pentanone O-acetyloxime, 2-hexanone O-acetyloxime, 3-hexanone O-acetyloxime, 2-heptanone O-acetyloxime, 3-heptanone O-acetyloxime, 4-heptanone O-acetyloxime, 2-octanone O-acetyloxime, 3-octanone O-acetyloxime, 2-nonanone O-acetyloxime, 3-nonanone O-acetyloxime, 5-nonanone O-acetyloxime, acetophenone O-acetyloxime, benzophenone O-acetyloxime, 4,4'-bis(diethylamino)benzophenone O-acetyloxime, cyclobutanone O-acetyloxime, cyclopentanone O-acetyloxime, cyclohexanone O-acetyloxime, cycloheptanone O-acetyloxime, cyclooctanone O-acetyloxime, cyclononanone O-acetyloxime, cyclodecanone O-acetyloxime, cycloundecanone O-acetyloxime, cyclododecanone O-acetyloxime, and cyclotridecanone O-acetyloxime, benzophenone O-acetyloxime, 4,4'-bis(diethylamino)benzophenone O-acetyloxime, 2-pyridinecarboxaldehyde O-acetyloxime, 2-pyridinecarboxaldehyde O-acetyloxime, tetrahydrofuran-3-carboxaldehyde O-acetyloxime, 2-furancarboxaldehyde O-acetyloxime, 3-furancarboxaldehyde O-acetyloxime, N-methyl-4-pyrazolecarboxaldehyde O-acetyloxime, N-methyl-2-pyrrolecarboxaldehyde O-acetyloxime, N-methyl-2-imidazolecarboxaldehyde O-acetyloxime, N-methyl-indole-3-carboxaldehyde O-acetyloxime, N-methyl-1,2,3-triazole-4-carboxaldehyde O-acetyloxime, N-methyl-1,2,4-triazole-3-carboxaldehyde O-acetyloxime, pyrazinecarboxaldehyde O-acetyloxime, 2-thiazolecarboxaldehyde O-acetyloxime, 2-thiophenecarboxaldehyde O-acetyloxime, 1,3-dimethyl-2-imidazolidinone O-acetyloxime, 2-acetylthiophene O-acetyloxime, 2-acetylthiazole O-acetyloxime, 2-acetylpyridine O-acetyloxime, 3-acetylpyridine O-acetyloxime, 4-acetylpyridine O-acetyloxime, bis(2-pyridyl)ketone O-acetyloxime, 2-acetyl-1-methylpyrrole O-acetyloxime, 3-acetyl-1-methylpyrrole O-acetyloxime, and mixtures thereof.

7. The method of claim 6, where the lanthanide-based catalyst is formed by combining a lanthanide compound, an alkylating agent, and optionally a halogen-containing compound, with the proviso that the lanthanide compound or the alkylating agent includes a labile halogen atom in the absence of the optional halogen-containing compound.

8. The method of claim 7, where the alkylating agent includes an aluminoxane and an organoaluminum compound represented by the formula $AlR_nX_{3-n}$, where each R, which may be the same or different, is a mono-valent organic group that is attached to the aluminum atom via a carbon atom, where each X, which may be the same or different, is a hydrogen atom, a halogen atom, a carboxylate group, an alkoxide group, or an aryloxide group, and where n is an integer of 1 to 3.

9. The method of claim 6, where said step of reacting the reactive polymer with a protected oxime compound occurs before the reactive polymer is quenched.

10. A method for preparing a functionalized polymer, the method comprising the steps of:
   (i) polymerizing conjugated diene monomer by employing a lanthanide-based catalyst to form a reactive polymer having a reactive chain end; and
   (ii) reacting the reactive chain end with a protected oxime compound selected from the group consisting of formaldehyde O-benzenesulfonyloxime, formaldehyde O-trifluoromethanesulfonyloxime, acetaldehyde O-benzenesulfonyloxime, propanal O-benzenesulfonyloxime, butanal O-benzenesulfonyloxime, pentanal O-benzenesulfonyloxime, cyclopentanecarboxaldehyde O-benzenesulfonyloxime, hexanal O-benzenesulfonyloxime, cyclohexanecarboxaldehyde O-benzenesulfonyloxime, heptanal O-benzenesulfonyloxime, cycloheptanecarboxaldehyde O-benzenesulfonyloxime, octanal O-benzenesulfonyloxime, cyclooctanecarboxaldehyde O-benzenesulfonyloxime, nonanal O-benzenesulfonyloxime, cyclononanecarboxaldehyde O-benzenesulfonyloxime, benzaldehyde O-benzenesulfonyloxime, benzaldehyde O-trifluoromethanesulfonyloxime, 2-methoxybenzaldehyde O-benzenesulfonyloxime, 4-diethylaminobenzaldehyde O-benzenesulfonyloxime, 4-diethylaminobenzaldehyde O-benzenesulfonyloxime, trans-cinnamaldehyde O-benzenesulfonyloxime, ferrocenecarboxaldehyde O-benzenesulfonyloxime, acetylferrocene O-benzenesulfonyloxime, acetone O-benzenesulfonyloxime, 2-butanone O-benzenesulfonyloxime, 2-pentanone O-benzenesulfonyloxime, 3-pentanone O-benzenesulfonyloxime, 2-hexanone O-benzenesulfonyloxime, 3-hexanone O-benzenesulfonyloxime, 2-heptanone O-benzenesulfonyloxime, 3-heptanone O-benzenesulfonyloxime, 4-heptanone O-benzenesulfonyloxime, 2-octanone O-benzenesulfonyloxime, 3-octanone O-benzenesulfonyloxime, 2-nonanone O-benzenesulfonyloxime, 3-nonanone O-benzenesulfonyloxime, 5-nonanone O-benzenesulfonyloxime, acetophenone O-benzenesulfonyloxime, benzophenone O-benzenesulfonyloxime, 4,4'-bis(diethylamino)benzophenone O-benzenesulfonyloxime, cyclobutanone O-benzenesulfonyloxime, cyclopentanone O-benzenesulfonyloxime, cyclohexanone O-benzenesulfonyloxime, cycloheptanone O-benzenesulfonyloxime, cyclooctanone O-benzenesulfonyloxime, cyclononanone O-benzenesulfonyloxime, cyclodecanone O-benzenesulfonyloxime, cycloundecanone O-benzenesulfonyloxime, cyclododecanone O-benzenesulfonyloxime, and cyclotridecanone O-benzenesulfonyloxime, benzophenone O-benzenesulfonyloxime, 4,4'-bis(diethylamino)benzophenone O-benzenesulfonyloxime, 2-pyridinecarboxaldehyde O-benzenesulfonyloxime, 2-pyridinecarboxaldehyde O-benzenesulfonyloxime, tetrahydrofuran-3-carboxaldehyde O-benzenesulfonyloxime, 2-furancarboxaldehyde O-benzenesulfonyloxime, 3-furancarboxaldehyde O-benzenesulfonyloxime, N-methyl-4-pyrazolecarboxaldehyde O-benzenesulfonyloxime, N-methyl-2-pyrrolecarboxaldehyde O-benzenesulfonyloxime, N-methyl-2-imidazolecarboxaldehyde O-benzenesulfonyloxime, N-methyl-indole-3-carboxaldehyde O-benzenesulfonyloxime, N-methyl-1,2,3-triazole-4-carboxaldehyde O-benzenesulfonyloxime, N-methyl-1,2,4-triazole-3-carboxaldehyde O-benzenesulfonyloxime, pyrazinecarboxaldehyde O-benzenesulfonyloxime, 2-thiazolecarboxaldehyde O-benzenesulfonyloxime, 2-thiophenecarboxaldehyde O-benzenesulfonyloxime, 1,3-dimethyl-2-imidazolidinone O-benzenesulfonyloxime, 2-acetylthiophene O-benzenesulfonyloxime, 2-acetylthiazole O-benzenesulfonyloxime, 2-acetylpyridine O-benzenesulfonyloxime, 3-acetylpyridine O-benzenesulfonyloxime, 4-acetylpyridine O-benzenesulfonyloxime, bis(2-pyridyl)ketone O-benzenesulfonyloxime, 2-acetyl-1-methylpyrrole O-benzenesulfonyloxime, 3-acetyl-1-methylpyrrole O-benzenesulfonyloxime, and mixtures thereof.

11. The method of claim 10, where the lanthanide-based catalyst is formed by combining a lanthanide compound, an alkylating agent, and optionally a halogen-containing compound, with the proviso that the lanthanide compound or the alkylating agent includes a labile halogen atom in the absence of the optional halogen-containing compound.

12. The method of claim 11, where the alkylating agent includes an aluminoxane and an organoaluminum compound represented by the formula $AlR_nX_{3-n}$, where each R, which may be the same or different, is a mono-valent organic group that is attached to the aluminum atom via a carbon atom, where each X, which may be the same or different, is a hydrogen atom, a halogen atom, a carboxylate group, an alkoxide group, or an aryloxide group, and where n is an integer of 1 to 3.

13. The method of claim 10, where said step of reacting the reactive polymer with a protected oxime compound occurs before the reactive polymer is quenched.

14. A method for preparing a functionalized polymer, the method comprising the steps of:
   (i) polymerizing conjugated diene monomer by employing a lanthanide-based catalyst to form a reactive polymer having a reactive chain end; and
   (ii) reacting the reactive chain end with a protected oxime compound selected from the group consisting of formaldehyde O-trimethylsilyloxime, acetaldehyde O-trimethylsilyloxime, butanal O-trimethylsilyloxime, benzaldehyde O-trimethylsilyloxime, 2-methoxybenzaldehyde O-trimethylsilyloxime, 4-diethylaminobenzaldehyde O-trimethylsilyloxime, trans-cinnamaldehyde O-trimethylsilyloxime, ferrocenecarboxaldehyde O-trimethylsilyloxime, acetone O-trimethylsilyloxime, 2-butanone O-trimethylsilyloxime, acetophenone O-trimethylsilyloxime, benzophenone O-trimethylsilyloxime, 4,4'-bis(diethylamino)benzophenone O-trimethylsilyloxime, cyclobutanone O-trimethylsilyloxime, cyclopentanone O-trimethylsilyloxime, cyclohexanone O-trimethylsilyloxime, 2-pyridinecarboxaldehyde O-trimethylsilyloxime, tetrahydrofuran-3-carboxaldehyde O-trimethylsilyloxime, N-methyl-4-pyrazolecarboxaldehyde O-trimethylsilyloxime, N-methyl-2-imidazolecarboxaldehyde O-trimethylsilyloxime, N-methyl-indole-3-carboxaldehyde O-trimethylsilyloxime, N-methyl-1,2,3-triazole-4-carboxaldehyde O-trimethylsilyloxime, pyrazinecarboxaldehyde O-trimethylsilyloxime, 2-thiazolecarboxaldehyde O-trimethylsilyloxime, 2-thiophenecarboxaldehyde O-trimethylsilyloxime, 1,3-dimethyl-2-imidazolidinone O-trimethylsilyloxime, 2-acetylthiophene O-trimethylsilyloxime, 2-acetylthiazole O-trimethylsilyloxime, 2-acetylpyridine O-trimethylsilyloxime, 2-acetyl-1-methylpyrrole O-trimethylsilyloxime, formaldehyde O-triphenylsilyloxime, acetaldehyde O-triphenylsilyloxime, butanal O-triphenylsilyloxime, benzaldehyde O-triphenylsilyloxime, 2-methoxybenzaldehyde O-triphenylsilyloxime, 4-diethylaminobenzaldehyde O-triphenylsilyloxime, trans-cinnamaldehyde O-triphenylsilyloxime, ferrocenecarboxaldehyde O-triphenylsilyloxime, acetone O-triphenylsilyloxime, 2-butanone O-triphenylsilyloxime, acetophenone O-triphenylsilyloxime, benzophenone O-triphenylsilyloxime, 4,4'-bis(diethylamino)benzophenone O-triphenylsilyloxime, cyclobutanone O-triphenylsilyloxime, cyclopentanone O-triphenylsilyloxime, cyclohexanone O-triphenylsilyloxime, 2-pyridinecarboxaldehyde O-triphenylsilyloxime, tetrahydrofuran-3-carboxaldehyde O-triphenylsilyloxime, N-methyl-4-pyrazolecarboxaldehyde O-triphenylsilyloxime, N-methyl-2-imidazolecarboxaldehyde O-triphenylsilyloxime, N-methyl-indole-3-carboxaldehyde O-triphenylsilyloxime, N-methyl-1,2,3-triazole-4-carboxaldehyde O-triphenylsilyloxime, pyrazinecarboxaldehyde O-triphenylsilyloxime, 2-thiazolecarboxaldehyde O-trimphenylsilyloxime, 2-thiophenecarboxaldehyde O-triphenylsilyloxime, 1,3-dimethyl-2-imidazolidinone O-triphenylsilyloxime, 2-acetylthiophene O-triphenylsilyloxime, 2-acetylthiazole O-triphenylsilyloxime, 2-acetylpyridine O-triphenylsilyloxime, 2-acetyl-1-methylpyrrole O-triphenylsilyloxime, formaldehyde O-tribenzyllsilyloxime, acetaldehyde O-tribenzylsilyloxime, butanal O-tribenzylsilyloxime, benzaldehyde O-tribenzylsilyloxime, 2-methoxybenzaldehyde O-tribenzylsilyloxime, 4-diethylaminobenzaldehyde O-tribenzylsilyloxime, trans-cinnamaldehyde O-tribenzylsilyloxime, ferrocenecarboxaldehyde O-tribenzylsilyloxime, acetone O-tribenzylsilyloxime, 2-butanone O-tribenzylsilyloxime, acetophenone O-tribenzylsilyloxime, benzophenone O-tribenzyllsilyloxime, 4,4'-bis(diethylamino)benzophenone O-tribenzylsilyloxime, cyclobutanone O-tribenzylsilyloxime, cyclopentanone O-tribenzylsilyloxime, cyclohexanone O-tribenzylsilyloxime, 2-pyridinecarboxaldehyde O-tribenzylsilyloxime, tetrahydrofuran-3-carboxaldehyde O-tribenzylsilyloxime, N-methyl-4-pyrazolecarboxaldehyde O-tribenzylsilyloxime, N-methyl-2-imidazolecarboxaldehyde O-tribenzylsilyloxime, N-methyl-indole-3-carboxaldehyde O-tribenzylsilyloxime, N-methyl-1,2,3-triazole-4-carboxaldehyde O-tribenzylsilyloxime, pyrazinecarboxaldehyde O-tribenzylsilyloxime, 2-thiazolecarboxaldehyde O-tribenzylsilyloxime, 2-thiophenecarboxaldehyde O-tribenzylsilyloxime, 1,3-dimethyl-2-imidazolidinone O-tribenzylsilyloxime, 2-acetylthiophene O-tribenzylsilyloxime, 2-acetylthiazole O-tribenzylsilyloxime, 2-acetylpyridine O-tribenzylsilyloxime, 2-acetyl-1-methylpyrrole O-tribenzylsilyloxime, formaldehyde O-dimethylhydrosilyloxime, acetaldehyde O-dimethylhydrosilyloxime, butanal O-dimethylhydrosilyloxime, benzaldehyde O-dimethylhydrosilyloxime, 2-methoxybenzaldehyde O-dimethylhydrosilyloxime, 4-diethylaminobenzaldehyde O-dimethylhydrosilyloxime, trans-cinnamaldehyde O-dimethylhydrosilyloxime, ferrocenecarboxaldehyde O-dimethylhydrosilyloxime, acetone O-dimethylhydrosilyloxime, 2-butanone O-dimethylhydrosilyloxime, acetophenone O-dimethylhydrosilyloxime, benzophenone O-dimethylhydrosilyloxime, 4,4'-bis(diethylamino)benzophenone O-dimethylhydrosilyloxime, cyclobutanone O-dimethylhydrosilyloxime, cyclopentanone O-dimethylhydrosilyloxime, cyclohexanone O-dimethylhydrosilyloxime, 2-pyridinecarboxaldehyde O-dimethylhydrosilyloxime, tetrahydrofuran-3-carboxaldehyde O-dimethylhydrosilyloxime, N-methyl-4-pyrazolecarboxaldehyde O-dimethylhydrosilyloxime, N-methyl-2-imidazolecarboxaldehyde O-dimethylhydrosilyloxime, N-methyl-indole-3-carboxaldehyde O-dimethylhydrosilyloxime, N-methyl-1,2,3-triazole-4-carboxaldehyde O-dimethylhydrosilyloxime, pyrazinecarboxaldehyde O-dimethylhydrosilyloxime, 2-thiazolecarboxaldehyde O-dimethylhydrosilyloxime, 2-thiophenecarboxaldehyde O-dimethylhydrosilyloxime, 1,3-dimethyl-2-imidazolidinone O-dimethylhydrosilyloxime, 2-acetylthiophene O-dimethylhydrosilyloxime, 2-acetylthiazole O-dimethylhydrosilyloxime, 2-acetylpyridine O-dimethylhydrosilyloxime, 2-acetyl-1-methylpyrrole O-dimethylhydrosilyloxime, formaldehyde O-diisopropylhydrosilyloxime, acetaldehyde O-diisopropylhydrosilyloxime, butanal O-diisopropylhydrosilyloxime, benzaldehyde O-diisopropylhydrosilyloxime, 2-methoxybenzaldehyde O-diisopropylhydrosilyloxime, 4-diethylaminobenzaldehyde O-diisopropylhydrosilyloxime, trans-cinnamaldehyde O-diisopropylhydrosilyloxime, ferrocenecarboxaldehyde O-diisopropylhydrosilyloxime, acetone O-diisopropylhydrosilyloxime, 2-butanone O-diisopropylhydrosilyloxime, acetophenone O-diisopropylhydrosilyloxime, benzophenone O-diisopropylhydrosilyloxime, 4,4'-bis(diethylamino)benzophenone O-diisopropylhydrosilyloxime, cyclobutanone O-diisopropylhydrosilyloxime, cyclopentanone O-diisopropylhydrosilyloxime, cyclohexanone O-diisopropylhydrosilyloxime, 2-pyridinecarboxaldehyde O-diisopropylhydrosilyloxime, tetrahydrofuran-3-carboxaldehyde O-diisopropylhydrosilyloxime, N-methyl-4-pyrazolecarboxaldehyde O-diisopropylhydrosilyloxime, N-methyl-2-imidazolecarboxaldehyde O-diisopropylhydrosilyloxime, N-methyl-indole-3-carboxaldehyde O-diisopropylhydrosilyloxime, N-methyl-1,2,3-triazole-4-carboxaldehyde O-diisopropylhydrosilyloxime, pyrazinecarboxaldehyde O-diisopropylhydrosilyloxime, 2-thiazolecarboxaldehyde O-diisopropylhydrosilyloxime, 2-thiophenecarboxaldehyde O-diisopropylhydrosilyloxime, 1,3-dimethyl-2-imidazolidinone O-diisopropylhydrosilyloxime, 2-acetylthiophene O-diisopropylhydrosilyloxime, 2-acetylthiazole O-diisopropylhydrosilyloxime, 2-acetylpyridine O-diisopropylhydrosilyloxime, and 2-acetyl-1-methylpyrrole O-diisopropylhydrosilyloxime.

15. The method of claim 14, where the lanthanide-based catalyst is formed by combining a lanthanide compound, an alkylating agent, and optionally a halogen-containing compound, with the proviso that the lanthanide compound or the alkylating agent includes a labile halogen atom in the absence of the optional halogen-containing compound.

16. The method of claim 15, where the alkylating agent includes an aluminoxane and an organoaluminum compound represented by the formula $AlR_nX_{3-n}$, where each R, which may be the same or different, is a mono-valent organic group that is attached to the aluminum atom via a carbon atom, where each X, which may be the same or different, is a hydrogen atom, a halogen atom, a carboxylate group, an alkoxide group, or an aryloxide group, and where n is an integer of 1 to 3.

17. The method of claim 14, where said step of reacting the reactive polymer with a protected oxime compound occurs before the reactive polymer is quenched.

18. A method for preparing a functionalized polymer, the method comprising the steps of:
  (i) polymerizing conjugated diene monomer by employing a lanthanide-based catalyst to form a reactive polymer having a reactive chain end; and
  (ii) reacting the reactive chain end with a protected oxime compound defined by the formula I

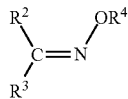

where $R^2$ and $R^3$ are each independently a hydrogen atom or a mono-valent organic group, with the proviso that at least one of $R^2$ or $R^3$ is a bicyclic or polycyclic aryl group, and $R^4$ is a mono-valent organic group.

* * * * *